(12) United States Patent
Zobel et al.

(10) Patent No.: US 10,165,200 B2
(45) Date of Patent: Dec. 25, 2018

(54) PROCESSING MULTIPLE IMAGE FRAMES

(71) Applicant: QUALCOMM Incorporated, San Diego, CA (US)

(72) Inventors: Pia Zobel, Hinanit (IL); Roee Hardoon, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/487,333

(22) Filed: Apr. 13, 2017

(65) Prior Publication Data

US 2018/0302573 A1 Oct. 18, 2018

(51) Int. Cl.
*H04N 5/265* (2006.01)
*G06K 9/62* (2006.01)

(52) U.S. Cl.
CPC .......... *H04N 5/265* (2013.01); *G06K 9/6202* (2013.01)

(58) Field of Classification Search
CPC ..................... H04N 5/265; G06K 9/6202
See application file for complete search history.

(56) References Cited

U.S. PATENT DOCUMENTS

| 8,659,701 | B2 | 2/2014 | Enenkl et al. |
| 8,724,705 | B2 | 5/2014 | Bock et al. |
| 9,292,904 | B2 | 3/2016 | Ruggiero |
| 2007/0280354 | A1 | 12/2007 | Park et al. |
| 2011/0242423 | A1 | 10/2011 | Lee et al. |
| 2013/0229581 | A1* | 9/2013 | Joshi ............... G11B 27/031 348/584 |

* cited by examiner

*Primary Examiner* — Ahmed A Berhan
(74) *Attorney, Agent, or Firm* — Paradice & Li LLP

(57) ABSTRACT

Methods and apparatuses are disclosed for processing a plurality of captured image frames. An example method may include receiving a first image frame and a second image frame from a camera sensor. The example method may also include determining a first portion of the second image frame with a temporal difference from a corresponding first portion of the first image frame, wherein a second portion of the second image frame is without a temporal difference from a corresponding second portion of the first image frame. The example method may also include processing the second image frame, including processing the first portion of the second image frame, and preventing processing the second portion of the second image frame.

26 Claims, 17 Drawing Sheets

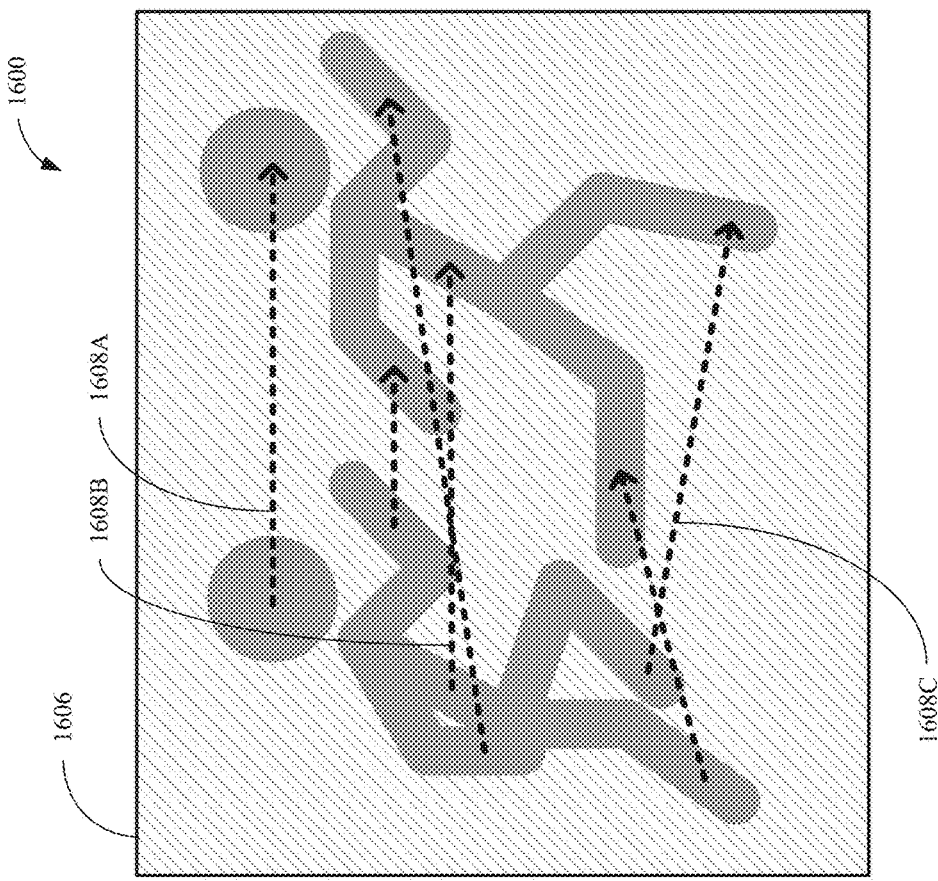
FIG. 16
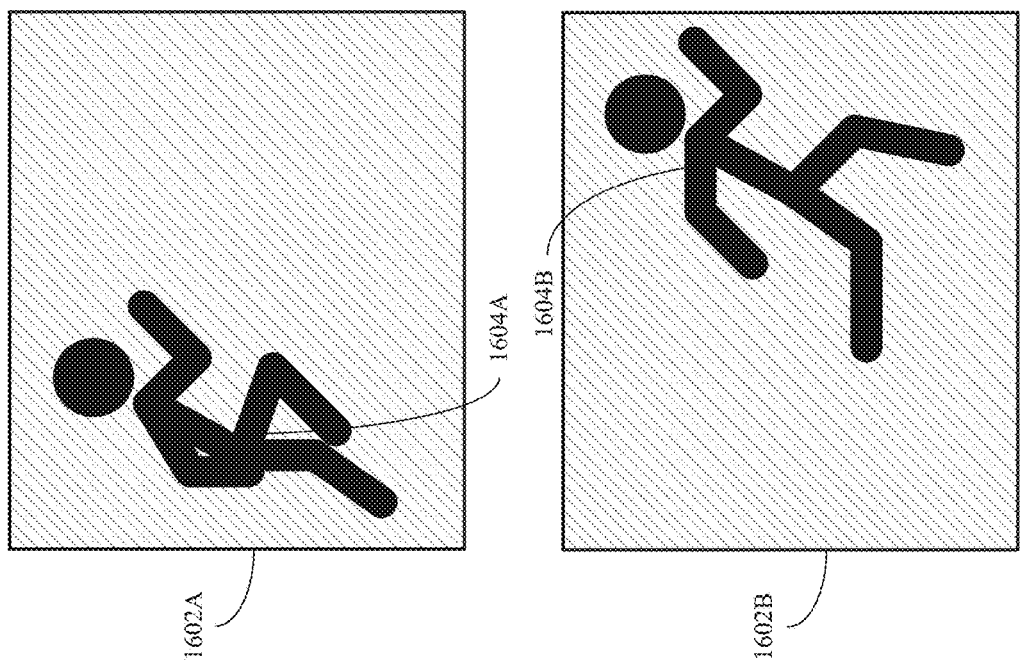

PROCESSING MULTIPLE IMAGE FRAMES

TECHNICAL FIELD

The present disclosure relates generally to processing camera image frames, and specifically to reducing processing requirements for image frames.

BACKGROUND

Many wireless communication devices (such as smartphones, tablets, and so on) and consumer devices (such as digital cameras, home security systems, and so on) use one or more cameras to capture images and/or video. Many images may be captured in quick succession. For example, a person capturing a picture may capture multiple image frames for one setting (such as for sports shots or quick action shots). Additionally, for video, a sequence of image frames are captured in quick succession (such as 30 frames per second (fps), 60 fps, 120 fps, and so on). As camera and display technologies progress, image resolution is increasing (such as from 480p to 720p, to 1080p, to Quad High Definition [HD], to 4K, to 8K, and so on). Additionally, the rate of capture is increasing (such as, for video, from 480p at 30 fps to 1080p at 60 fps, to 4K at 120 fps, and so on).

The captured image frames are typically processed before presented to a user for viewing. In traditional image and video processing, the captured image frames are processed in sequence, and an entire captured image frame is processed before a next captured image frame is processed. As frame capture rates and image resolutions continue to increase, the processing resources, memory requirements, latency constraints, and thermal dissipation of such image capturing devices also increase.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to methods and apparatuses for processing a plurality of captured image frames. An example method may include receiving a first image frame and a second image frame a camera sensor, and identifying a first portion of the second image frame having a temporal difference relative to a corresponding first portion of the first image frame, wherein a second portion of the second image frame is without a temporal difference relative to a corresponding second portion of the first image frame. The method may also include processing the first image frame, and generating a processed second image frame based on the identified first portion of the second image frame and at least one portion of the processed first image frame.

In another example, a device for processing a plurality of captured image frames is disclosed. The device may include a camera sensor to provide a first image frame and a second image frame. The device may also include one or more image signal processors configured to: identify a first portion of the second image frame having a temporal difference relative to a corresponding first portion of the first image frame, wherein a second portion of the second image frame is without a temporal difference relative to a corresponding second portion of the first image frame; process the first image frame; and generate a processed second image frame based on the identified first portion of the second image frame and at least one portion of the processed first image frame.

In another example, a non-transitory computer-readable storage medium is disclosed. The non-transitory computer-readable storage medium may store one or more programs containing instructions that, when executed by one or more processors of a device, cause the device to perform operations including: receiving a first image frame from a camera sensor; receiving a second image frame from the camera sensor; identifying a first portion of the second image frame having a temporal difference relative to a corresponding first portion of the first image frame, wherein a second portion of the second image frame is without a temporal difference relative to a corresponding second portion of the first image frame; processing the first image frame; and generating a processed second image frame based on the identified first portion of the second image frame and at least one portion of the processed first image frame.

In another example, a device for processing a plurality of captured image frames is disclosed. The device may include means for receiving a first image frame and a second image frame from a camera sensor. The device may also include means for identifying a first portion of the second image frame having a temporal difference relative to a corresponding first portion of the first image frame, wherein a second portion of the second image frame is without a temporal difference relative to a corresponding second portion of the first image frame; means for processing the first image frame; and means for generating a processed second image frame based on the identified first portion of the second image frame and at least one portion of the processed first image frame.

BRIEF DESCRIPTION OF THE DRAWINGS

The disclosure herein is illustrated by way of example, and not by way of limitation, in the figures of the accompanying drawings and in which like reference numerals refer to similar elements.

FIG. 16 is an illustration depicting another example of local motion between two images.

DETAILED DESCRIPTION

Figure 1:
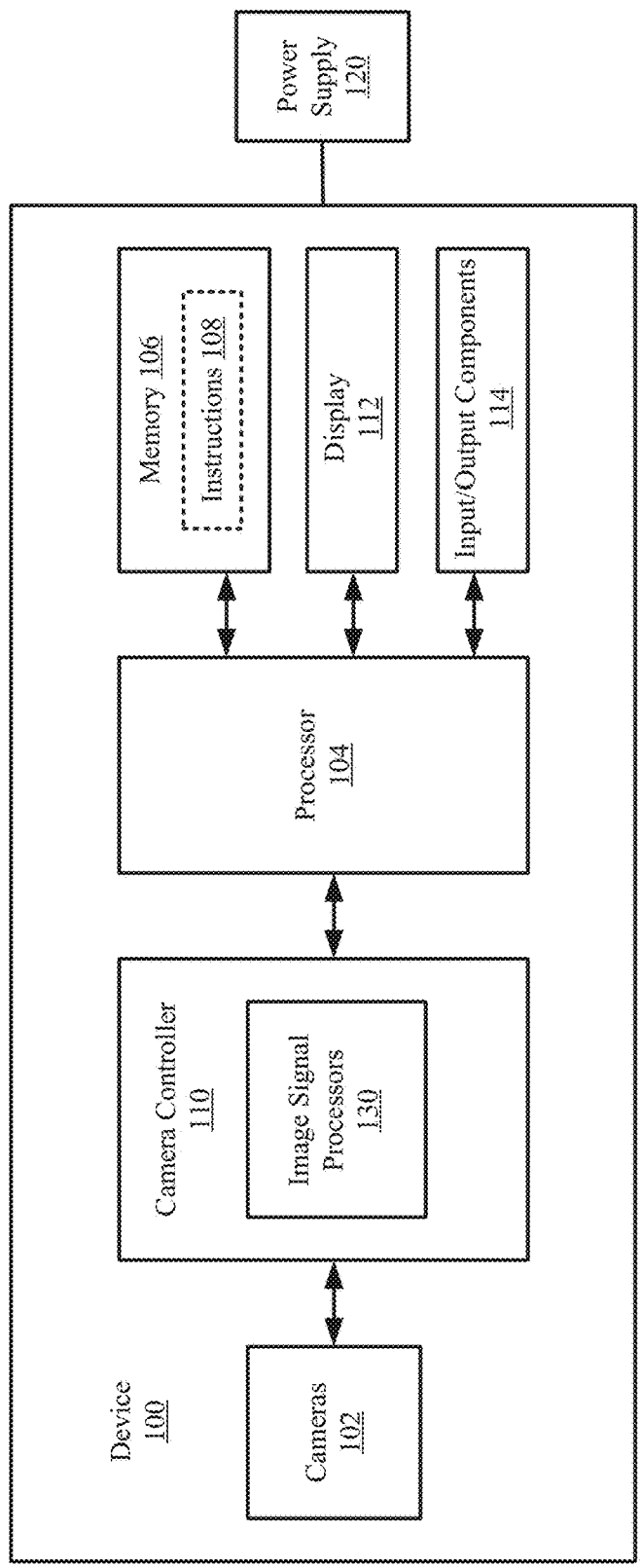
FIG. 1 is a block diagram of an example device that may be used to perform aspects of the present disclosure.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

FIG. 1 is a block diagram of an example device 100 that may be used to perform aspects of the present disclosure. The device 100 may be any suitable device capable of capturing images or video including, for example, wired and wireless communication devices (such as camera phones, smartphones, tablets, security systems, dash cameras, laptop computers, desktop computers, and so on) and digital cameras (including still cameras, video cameras, and so on). The example device 100 is shown in FIG. 1 to include at least one or more cameras 102, a processor 104, a memory 106 storing instructions 108, a camera controller 110, a display 112, and a number of input/output (I/O) components 114. The device 100 may include additional features or components not shown. For example, a wireless interface, which may include a number of transceivers and a baseband processor, may be included for a wireless communication device.

The cameras 102 may include the ability to capture individual image frames (such as still images) and/or to capture video (such as a succession of captured image frames). The cameras 102 may include one or more image sensors (not shown for simplicity) for capturing an image frame and providing the captured image frame to the camera controller 110.

The memory 106 may be a non-transient or non-transitory computer readable medium storing computer-executable instructions 108 to perform all or a portion of one or more operations described in this disclosure. The device 100 may also include a power supply 120, which may be coupled to or integrated into the device 100.

The processor 104 may be one or more suitable processors capable of executing scripts or instructions of one or more software programs (such as instructions 108) stored within memory 106. In some aspects of the present disclosure, the processor 104 may be one or more general purpose processors that execute instructions 108 to cause the device 100 to perform any number of different functions or operations. In additional or alternative aspects, the processor 104 may include integrated circuits or other hardware to perform functions or operations without the use of software. While shown to be coupled to each other via the processor 104 in the example of FIG. 1, the processor 104, memory 106, camera controller 110, the display 112, and I/O components 114 may be coupled to one another in various arrangements. For example, the processor 104, memory 106, camera controller 110, the display 112, and I/O components 114 may be coupled to each other via one or more local buses (not shown for simplicity).

The display 112 may be any suitable display or screen allowing for user interaction and/or to present items (such as captured images and video) for viewing by the user. In some aspects, the display 112 may be a touch-sensitive display. The I/O components 114 may be or include any suitable mechanism, interface, or device to receive input (such as commands) from the user and to provide output to the user. For example, the I/O components 114 may include (but are not limited to) a graphical user interface, keyboard, mouse, microphone and speakers, and so on. The device 100 may further include motion detection sensors, such as a gyroscope, accelerometer, compass, and so on, to determine a motion and orientation of the device 100.

The camera controller 110 may include one or more image signal processors 130 to process captured image frames or video provided by the cameras 102. In some example implementations, the camera controller 110 may receive from a sensor of cameras 102 a raw image frame that requires some processing before presentation for viewing by the user, and may then apply one or more filters to the raw image frame to ready the image for viewing, for example, on the display 112. Example filters may include noise reduction, edge enhancement, gamma correction, light balance, color contrast, and so on. For example, a captured image frame from a camera sensor may be a digital negative of the image to be viewed. The captured image frame may alternatively be in a data format that is not readily viewable, for example, on the display 112.

In some aspects of the present disclosure, one or more of the image signal processors 130 may execute instructions from a memory (such as instructions 108 from memory 106 or instructions stored in a separate memory coupled to the image signal processor) to process a captured image frame provided by the cameras 102. In some other aspects of the present disclosure, one or more of the image signal processors 130 may include specific hardware to apply one or more of the filters to the captured image frame. For example, one of the image signal processors 130 may include an integrated circuit to apply a bilateral filter to a captured image frame for noise reduction. The image signal processor 130 may also include a combination of specific hardware and the ability to execute software instructions to process a captured image frame.

Figure 2:
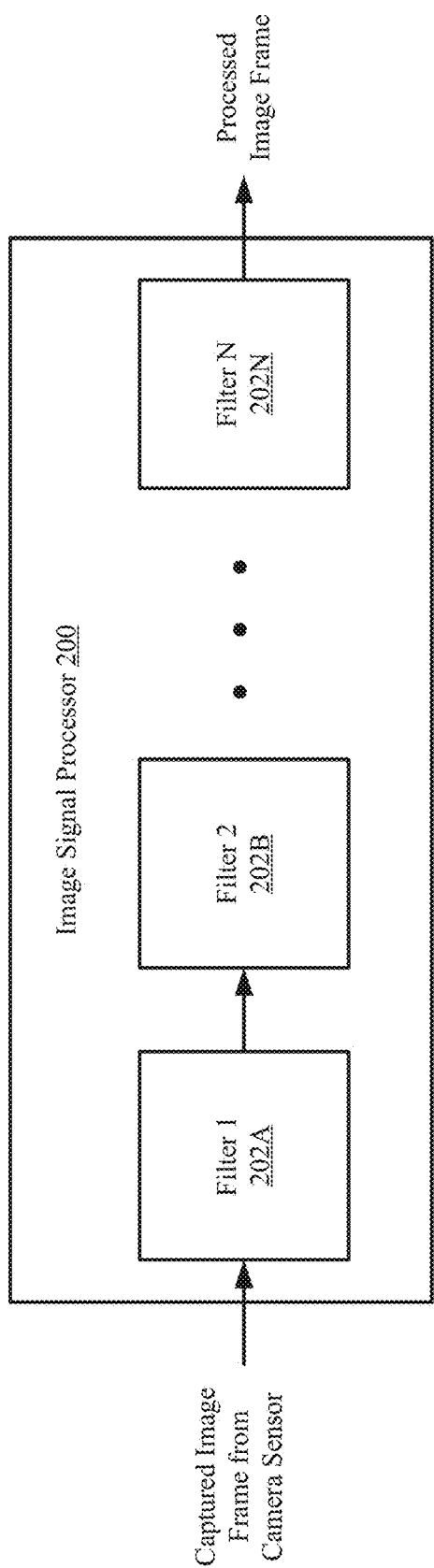
FIG. 2 is a block diagram of an example image signal processor.

FIG. 2 is a block diagram of an example image signal processor 200. The illustrated image signal processor 200 may be a single thread (or single core) processor with a sequence of filters 202A-202N. In one example implementation, filter 1 (202A) may be a noise reduction filter, filter 2 (202B) may be an edge enhancement filter, and filter N (202N) may be a final filter to complete processing the captured image frame.

When a conventional camera controller processes multiple image frames (such as for video), the conventional camera controller typically processes an entire captured image frame completely before the next captured image frame is processed. For example, the image signal processor 200 may sequentially apply filter 1 (202A) through filter N (202N) to a captured image frame before proceeding to process a next captured image frame. However, as image resolution and image capture rates increase, processing a captured image frame in its entirety before processing a subsequently captured image frame may cause bottlenecks in the image signal processor 200, for example, when there are more captured images to be processed than the image signal processor 200 is able to process in a given time period. Additionally, processing captured image frames in such a manner may cause a significant increase in thermal output and may consume limited processing resources as the image signal processor 200 attempts to keep up with the incoming sequence of captured image frames to be processed.

In accordance with various aspects of the present disclosure, a device such as device 100 may conserve processing resources, reduce memory latency constraints, and reduce thermal outputs by applying filters to only a portion of a captured image frame when processing the captured image frame. In some implementations, the device 100 may substitute a processed portion of a first captured image frame for a portion of a second captured image frame, for example, so that the filters may not be applied to the portion of the second captured image frame. For many images captured in quick succession (such as video and sports shots for still images), a sequence of image frames may include first portions that are substantially the same as each other, and may include second portions that are different from each other. For example, when capturing a video of a person or an object, the background may be static while the person or object moves. Portions of image frames that are different from one another may be described as having one or more temporal differences (portions of the image are different as time elapses), and portions of image frames that are substantially the same as each other may be described as having temporal similarities (or lacking temporal differences).

Figure 3:
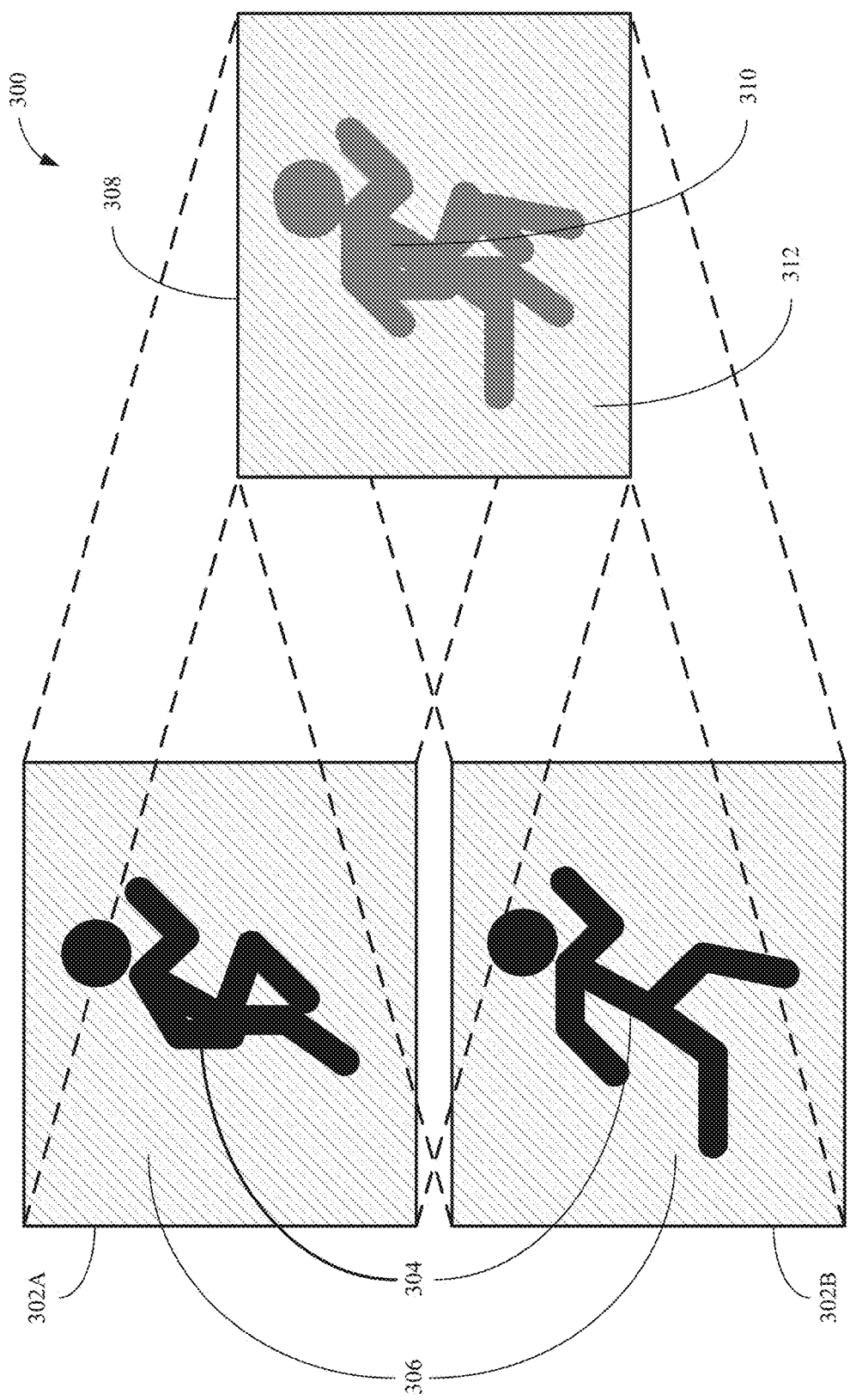
FIG. 3 is an illustration depicting temporal differences between successive image frames.

FIG. 3 is an illustration 300 depicting temporal differences between successive images. More specifically, the illustration 300 shows line drawings of an example first image 302A and an example second image 302B that have some temporal differences and some temporal similarities. The first image 302A may include a moving object 304 and a background 306 that is static between images. The second image 302B may also include the moving object 304 and the background 306. As shown, the object 304 may move between images 302A and 302B while the background 306 stays the same. Comparing the first image 302A to the second image 302B (such as overlaying the images 302A and 302B to create a comparison image 308) shows that some portions of the images 302A and 302B have temporal differences and other portions of the images 302A and 302B have no temporal differences. For example, a portion 312 of the comparison image 308 indicates that the background portion 306 is the same for both the first image 302A and the second image 302B, and a portion 310 of the comparison image 308 indicates temporal differences between portions of the first image 302A and the second image 302B that include object 304.

Although only one portion 310 of the image 308 with temporal differences is shown in the example illustration 300, a captured image frame may have multiple portions with temporal differences relative to another captured image frame. For example, an image or video may be taken of two or more moving objects (such as multiple players during a soccer game). Portions of the background may also move between images. For example, wind blowing through a tree in a captured image frame may cause branches of the tree to move between the captured image frames.

Figure 4:
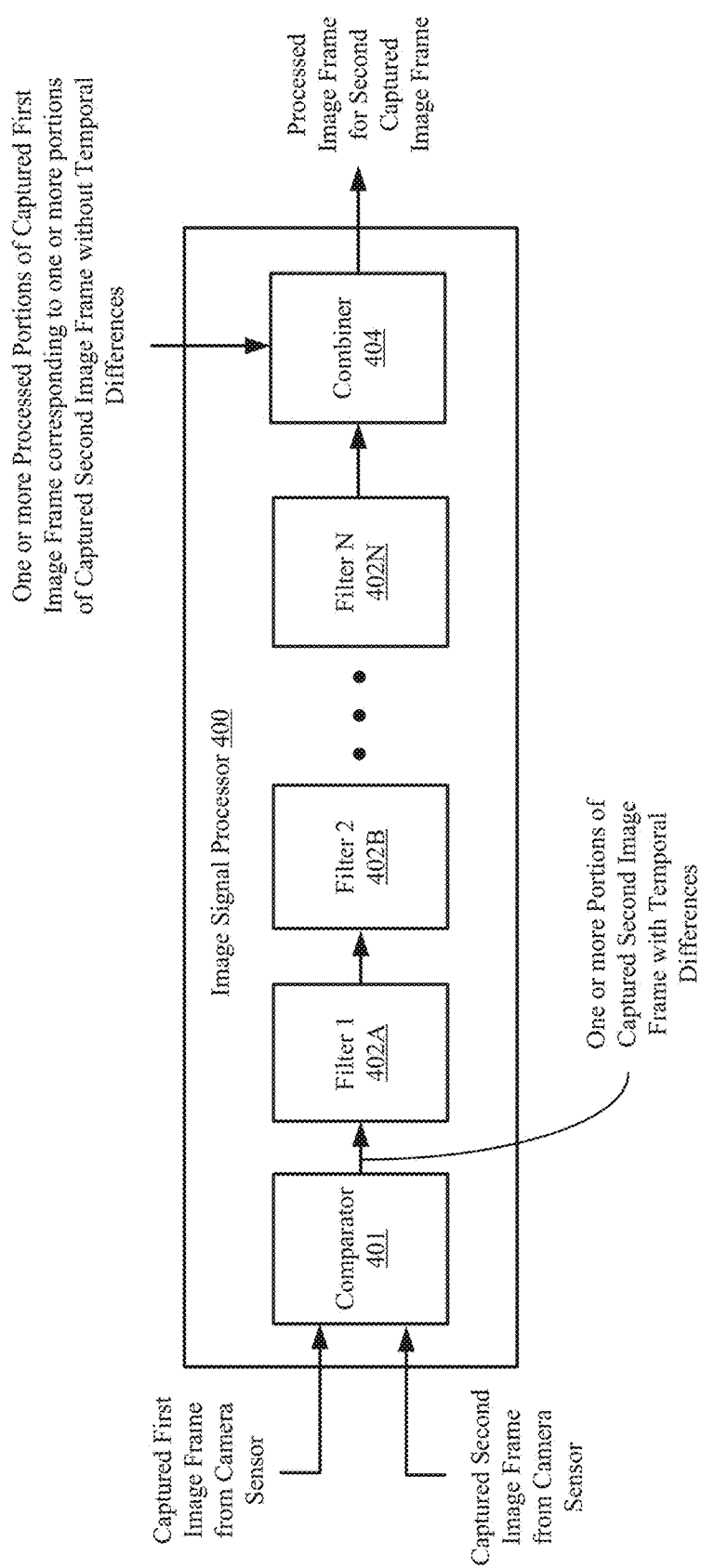
FIG. 4 is a block diagram of an example image signal processor, in accordance with some aspects of the present disclosure.

FIG. 4 is a block diagram of an example image signal processor 400, in accordance with some aspects of the present disclosure. The image signal processor 400, which may be one implementation of one or more of the image signal processors 130 of FIG. 1, may be used to determine portions of a captured image frame having temporal differences relative to another captured image frame, in accordance with some aspects of the present disclosure. The image signal processor 400 may include a comparator 401 for comparing two or more captured image frames, one or more filters 402A-402N for processing portions of a captured image frame with temporal differences relative to a previously captured image frame, and a combiner 404 to combine corresponding processed portions of the previously captured image frame (for which there is no temporal difference) with the processed portions of the captured image frame (such as provided by the last filter N) to generate the complete processed image frame.

In some implementations, every other captured image frame (or every $N^{th}$ captured image frame) may be processed in its entirety. For example, as shown in FIG. 4, a captured first image frame may be provided to a first input of comparator 401, and a captured second image frame may be provided to a second input of comparator 401. Then, a captured third image frame may be provided to the first input of comparator 401, and a captured fourth image frame may be provided to the second input of comparator 401 (with the process repeating for the remainder of a sequence of captured image frames). In this manner, the odd captured image frames are processed in their entirety, and only portions of the even captured image frames might be processed by the image signal processor 400.

In other implementations, multiple successive captured image frames may be compared to a captured first image frame. For example, as shown in FIG. 4, a captured first image frame may be provided to the first input of comparator 401, and a captured second image frame may be provided to the second input of comparator 401. Then, the captured first image frame may again be provided to the first input of comparator 401 (or alternatively stored by comparator 401 for later use), and a captured third image frame may be provided to the second input of comparator 401. The process may continue for a predetermined number of captured image frames. For example, the image signal processor 400 may use the captured first image frame for a number B of captured image frames. The image signal processor 400 may then use the captured B+1 image frame for a next number B of successive captured image frames.

The comparator 401 may switch between a first mode during which an entire captured image frame is provided to filter 1 (402A) and a second mode during which only portions of a captured image frame with temporal differences are provided to filter 1 (402A). In some aspects, the comparator 401 may determine whether portions of a captured first image frame have temporal differences (e.g., relative to corresponding portions of a captured second image frame) above a threshold size (such as greater than a threshold percentage of the area of the image frame, greater than a threshold number of pixels, and so on), and then operate in either the first mode or the second mode based on the determination. More specifically, if portions of a captured image frame have temporal differences that exceed the threshold, then the entire captured image frame may be provided to the filters 402A-402N for processing. Conversely, if portions of the captured image frame have temporal differences that do not exceed the threshold, then the comparator 401 may provide only the portions of the captured image frame with temporal differences to the filters 402A-402N for processing. In other aspects, operation of the image signal processor 400 in either the first mode or the second mode may be determined (such as by the user) based on the image resolution, frame capture rate, available memory resources, available processing resources, and so on.

Although the filters 402A-402N of image signal processor 400 may be similar to the filters 202A-202N of image signal processor 200 (FIG. 2), the image signal processor 200 is statically configured to use the filters 202A-202N to process the entirety of each captured image frame. In contrast, the image signal processor 400 may dynamically determine whether to use the filters 402A-402N to process the entirety of a captured image frame, or to use the filters 402A-402N to process only one or more identified portions of a captured image frame. As illustrated in FIG. 4, filter 1 (402A) may receive from the comparator 401 one or more portions of the captured second image frame with temporal differences relative to the captured first image frame. Thus, the filters 402A-402N may process only the portions of the captured second image frame provided by the comparator 401. The combiner 404 may receive (from a memory) the processed portions of the captured first image frame corresponding to portions of the captured second image frame without temporal differences. Alternatively or additionally, the combiner 404 may receive processed portions of the captured first image frame from another image signal processor (or from another core or thread of the same image signal processor), for example, where the captured first image frame and the captured second image frame are processed concurrently.

In some other example implementations, the comparator 401 may be external to image signal processor 400, for example, such that a captured image frame or portions of a captured image frame may be provided to image signal processor 400 from an external another source for processing. Additionally or alternatively, the combiner 404 may be external to the image signal processor 400, for example, and coupled to image signal processor 400 to receive processed portions of the captured image frame.

Figure 5:
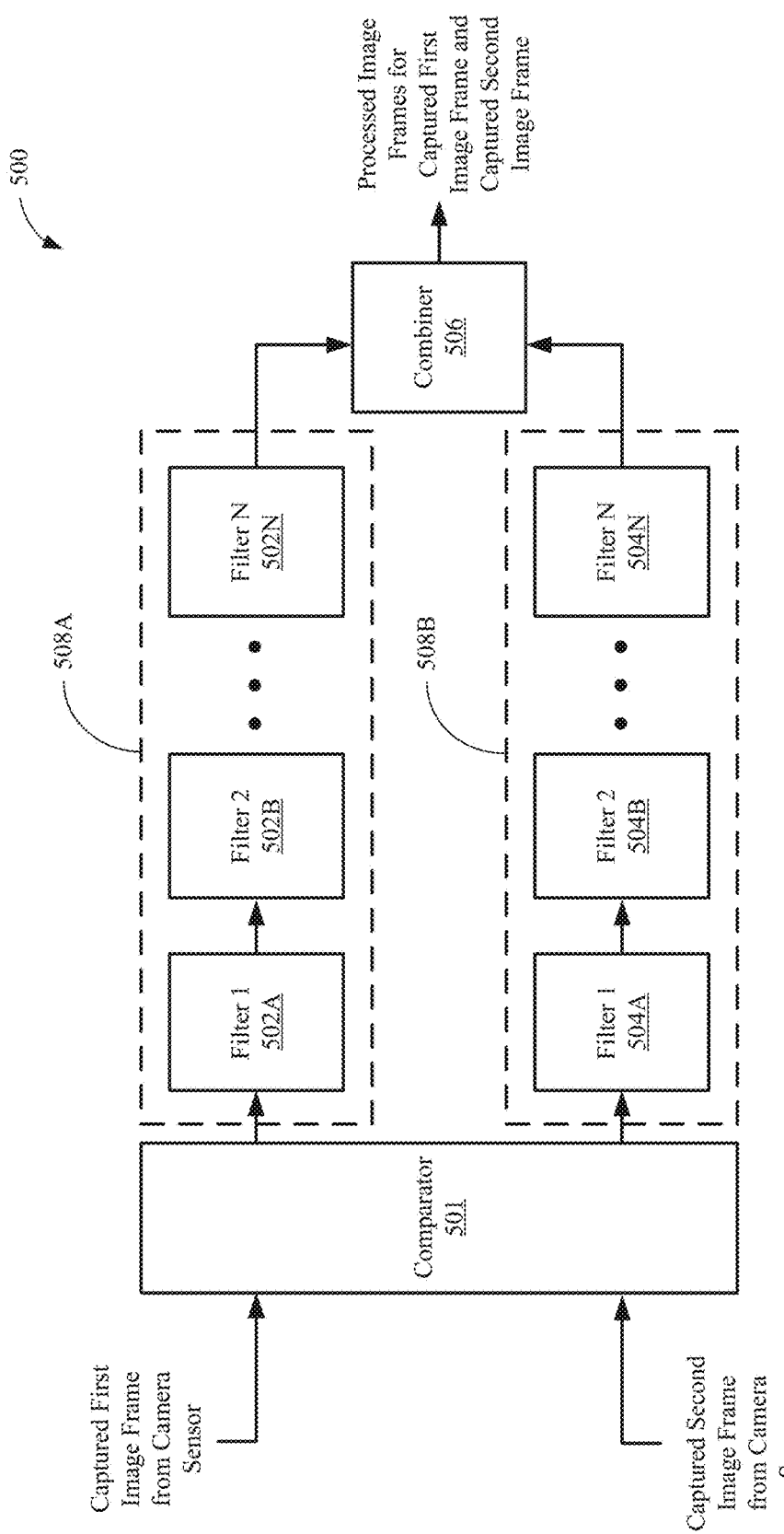
FIG. 5 is a block diagram of another example image signal processor, in accordance with some aspects of the present disclosure.

FIG. 5 is a block diagram of another example image signal processor 500, in accordance with some aspects of the present disclosure. The image signal processor 500, which may be another implementation of one or more of the image signal processors 130 of FIG. 1, is shown to include a comparator 501, a first filter core 508A, a second filter core 508B, and a combiner 506. The comparator 501 may be configured to receive a captured first image frame and receive a captured second image frame to determine or identify one or more portions of the captured second image frame with temporal differences relative to the captured first image frame. In some aspects, the comparator 501 may be configured to provide the entire captured first image frame to the first filters 502A-502N for processing and to provide only portions of the captured second image frame with temporal differences (relative to the captured first image frame) to the second filters 504A-504N for processing. Similar to the comparator 401 in FIG. 4, the comparator 501 may be able to operate in different modes. For example, in some aspects, the comparator 501 may provide the entire captured second image frame to the first filters 502A-502N for processing during a first mode, and may provide only portions of the captured second image frame with temporal differences to the second filters 502A-502N for processing during a second mode.

In some implementations, the first filters 502A-502N may be the same as the second filters 504A-504N. In some aspects, the first filters 502A-502N may form or be part of a first image signal processor, and the second filters 504A-504N may form or be part of a second image signal processor (separate from the first image signal processor). In other aspects, the first filters 502A-502N may be a first core or thread of an image signal processor, and the second filters 504A-504N may be a second core or thread of the image signal processor.

Although only two filter cores 508A and 508B are shown in the example of FIG. 5, the image signal processor 500 may include any suitable number of filter cores (such as cores or threads of the image signal processor 500). Accordingly, a device (such as device 100 in FIG. 1) may be able to process more than two captured image frames concurrently, for example, in implementations for which the image signal processor 500 includes more than two filter cores. For such implementations, the comparator 501 may include one or more output switches (not shown for simplicity) to selectively provide captured image frames (or identified portions of captured image frames) to a selected one of the filter sets or cores.

In some implementations, after processing a captured first image frame and portions of a captured second image frame, a device (such as device 100 of FIG. 1) may store the processed first image frame and the processed portions of the captured second image frame. In some aspects, the stored portions of the captured second image frame may include a pointer or other indication of which portions of a stored first image frame are to be used in creating the entire processed second image frame. For example, a stored video file may include a processed first image frame, processed portions of a second image frame, and an indication (such as a pointer) of the portions of the processed first image frame to be used with the processed portions of the second image frame in rendering the processed second image frame in its entirety.

Figure 6:
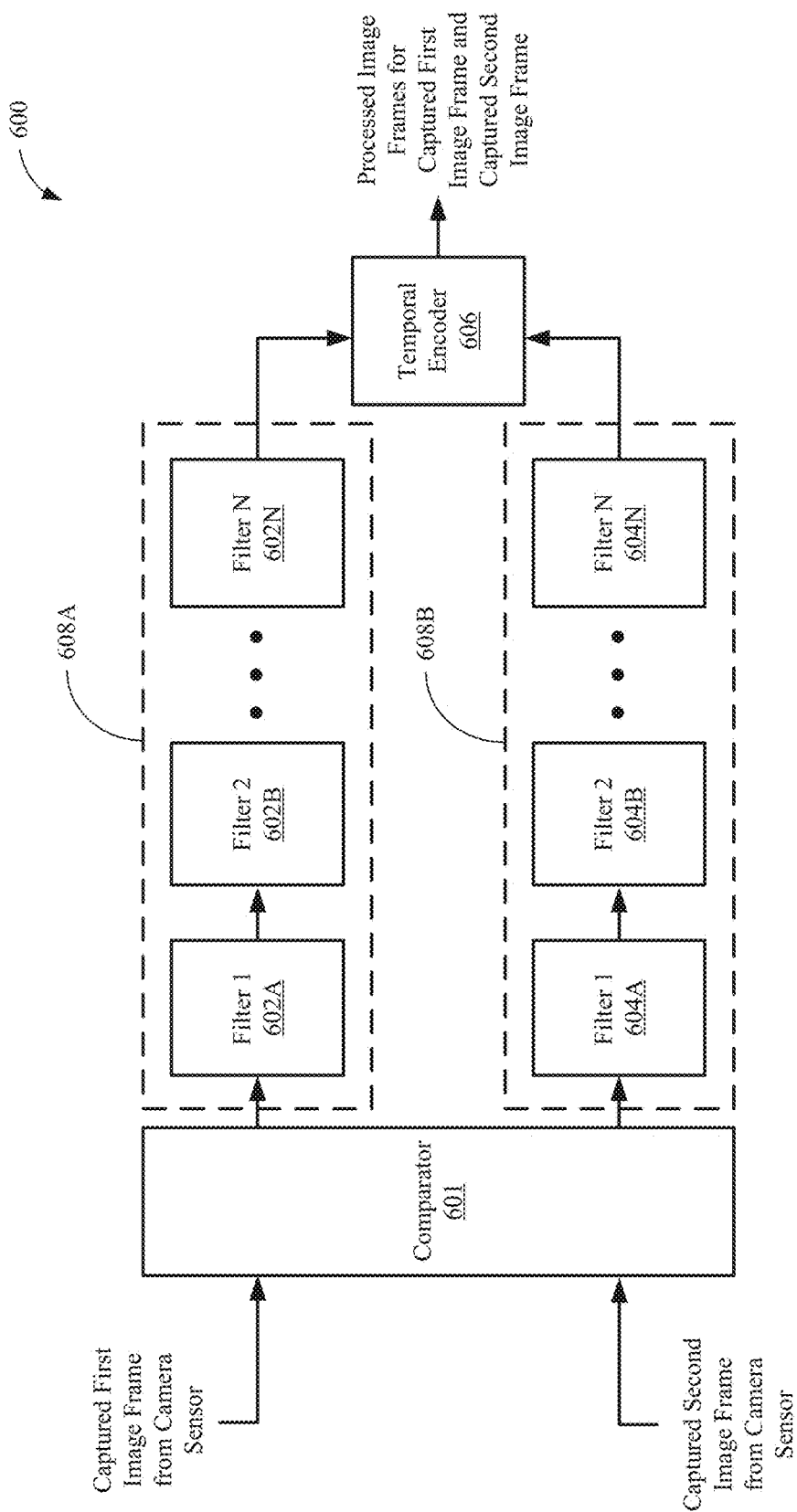
FIG. 6 is a block diagram of another example image signal processor, in accordance with some aspects of the present disclosure.

FIG. 6 is a block diagram of another example image signal processor 600, in accordance with some aspects of the present disclosure. The image signal processor 600, which may be another implementation of one or more of the image signal processors 130 of FIG. 1, is shown to include a comparator 601, a first filter core 608A, a second filter core 608B, and a temporal encoder 606. Although not shown for simplicity, the image signal processor 600 may include more than two filter cores or threads (or any suitable number of image signal processors). Aspects of the disclosure should not be limited to one or two image signal processors, threads or cores.

The temporal encoder 606 may be used to encode, combine, or otherwise bring together the processed first image frame and processed portions of the captured second image frame (such as for a video file, for a plurality of still images captured in quick succession and to be stored, and so on), for example, when the processed portions of the captured second image frame may include a pointer (or other indicator) to portions of the processed first image frame. The portions of the processed first image frame may later be combined with the processed portions of the second image frame to create the complete processed second image frame. For example, processed image frames output from the temporal encoder 606 may use the pointer or other indicator to determine which portions of the processed first image frame to combine with the processed portions of the captured second image frame to generate the entire processed second image frame. In some aspects, portions of the first image frame may be stitched with portions of the second image frame to generate the entire processed second image frame. In some example implementations, further processing may be performed on the combined image to create the complete processed second image frame. For example, a blending, noise reduction, or smoothing filter may be applied to the image to insure that the combined portions blend along their edges.

Figure 7:
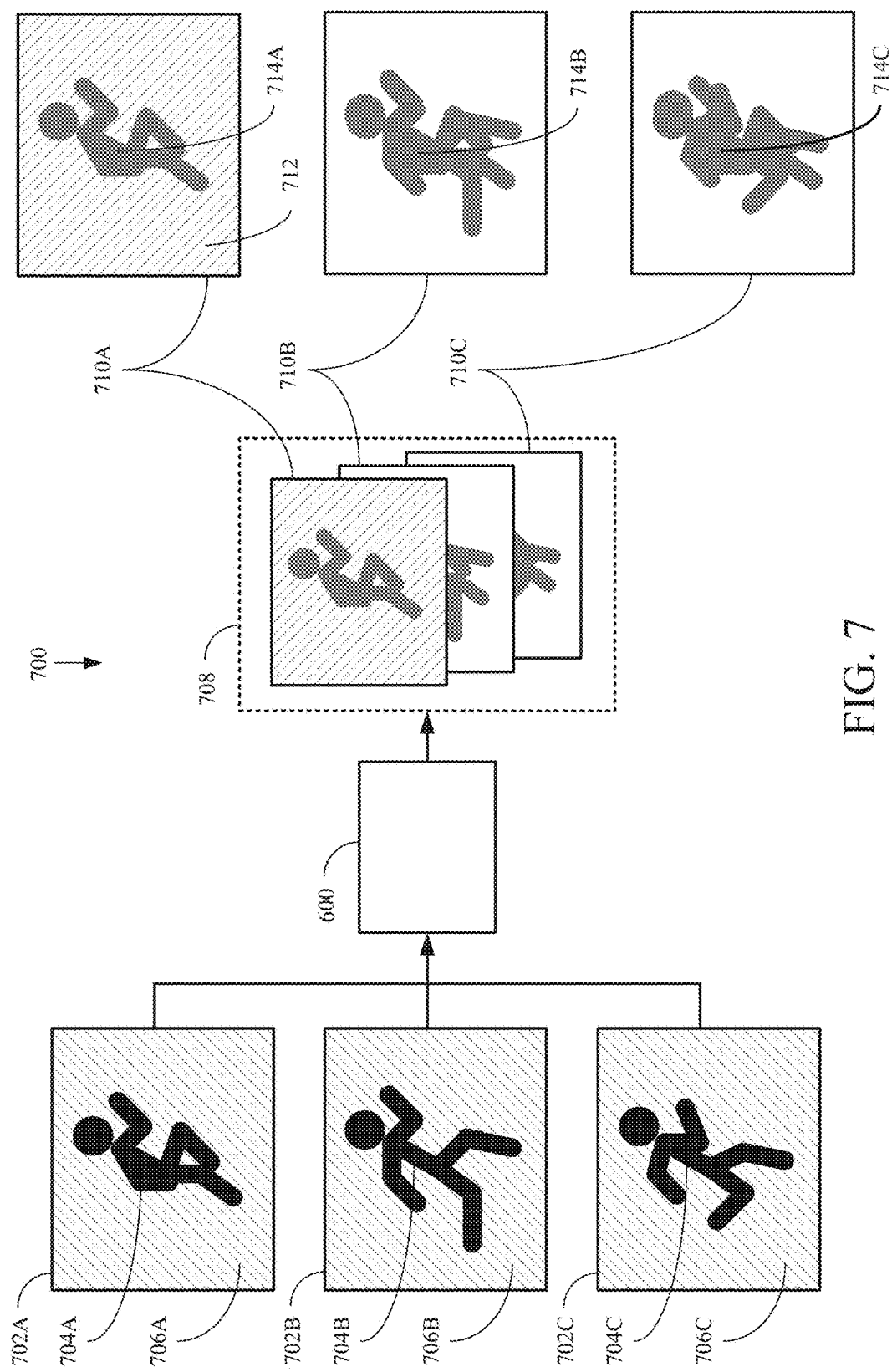
FIG. 7 is an illustration depicting an example operation for processing a plurality of captured image frames, in accordance with some aspects of the present disclosure.

FIG. 7 is an illustration 700 depicting an example operation for processing a plurality of captured image frames, in accordance with some aspects of the present disclosure. Referring also to FIG. 6, the comparator 601 may receive a plurality of captured image frames 702A, 702B, and 702C from a camera sensor (such as cameras 102 of FIG. 1). Although only three captured image frames are shown in the illustration 700, the image signal processor 600 may be used to process any number of captured image frames. As shown, the captured image frames 702A, 702B, and 702C include a person running (denoted as person 704A, person 704B, and person 704C, respectively). The captured image frames 702A, 702B, and 702C also include the same background (denoted as background 706A, background 706B, and background 706C, respectively).

The captured image frames 702A-702C may be provided to the comparator 601 to determine or identify portions of the captured image frames with temporal differences. Although the comparator 601 is shown as receiving only a captured first image frame 702A and a captured second image frame 702B, the comparator 601 may have other configurations or include additional inputs to receive any number of captured image frames. Additionally, an associated device (such as the device 100 of FIG. 1) may direct the captured image frames to the appropriate input of comparator 601. For example, if the comparator 601 has two inputs for receiving captured image frames, then the device 100 (or camera 102) may provide alternate captured image frames to each input of the comparator 601 (such as the first input receiving frames 1, 3, 5, 7, and so on, and the second input receiving frames 2, 4, 6, 8, and so on). However, any apportioning of frames may exist.

Referring back to FIGS. 6 and 7, the comparator 601 may compare the captured second image frame 702B to the captured first image frame 702A to determine or identify the portions of captured second image frame 702B with temporal differences relative to the captured first image frame 702A. In the example of FIG. 7, the person's movement causes portions of the captured image frames 702A-702C to have temporal differences between frames. In some additional examples, the backgrounds between the captured image frames may include slight differences (such as swaying tree branches, moving water ripples, moving objects in a distance, and so on). Therefore, there may be other portions of the captured image frames that also have temporal differences between frames. Example operations of a comparator (such as comparator 601) in determining or identifying portions of captured image frames with temporal differences are described below with respect to FIGS. 8 and 9.

A first filter core 608A of image signal processor 600 may then process the captured image frame 702A in its entirety. A second filter core 608B of image signal processor 600 may process the portions of the captured image frame 702B having temporal differences relative to the captured image frame 702A, for example, as determined by comparator 601. The comparator 601 may also compare the captured third image frame 702C to the captured first image frame 702A to determine or identify the portions of the captured third image frame 702C with temporal differences relative to the captured first image frame 702A. A third filter core (not shown) of image signal processor 600 may then process the portions of captured image frame 702C with temporal differences relative to the captured image frame 702A, for example, as determined by comparator 601. Processing frame 702A, portions of frame 702B, and portions of frame 702C may be performed concurrently or sequentially.

With the processed first image frame, the processed portions of the second image frame, and the processed portions of the third image frame, the temporal encoder 606 (FIG. 6) may group together or combine the processed information (such as into a video or a sequence of still images). Referring to FIG. 7, a composite image 708 represents an example video including the processed first image frame 710A (including processed background 712 and processed object 714A to cause temporal differences), processed portions 714B of the second image frame 710B, and processed portions 714C of the third image 710C. In some aspects of the present disclosure, portions of the object 704A may be the same as portions of the object 704B (or the same as portions of the object 704C). Therefore, processed portions of the object from processed image frame 710A may also be used for completing a processed second image frame or a processed third image frame.

The processed image frames 710B and 710C may include a pointer or other indicator to the processed background 712 in processed first image frame 710A. For example, the processed image frames 710B and 710C may not include pixel information outside of processed portions 714B and 714C, respectively, which may indicate to use the pixel information at corresponding locations from processed image frame 710A. In some other example implementations, if the comparator 601 compares the captured image frames at a macroblock level, then the missing information from processed portions 714B and 714C may also be at the macroblock level.

Figure 8:
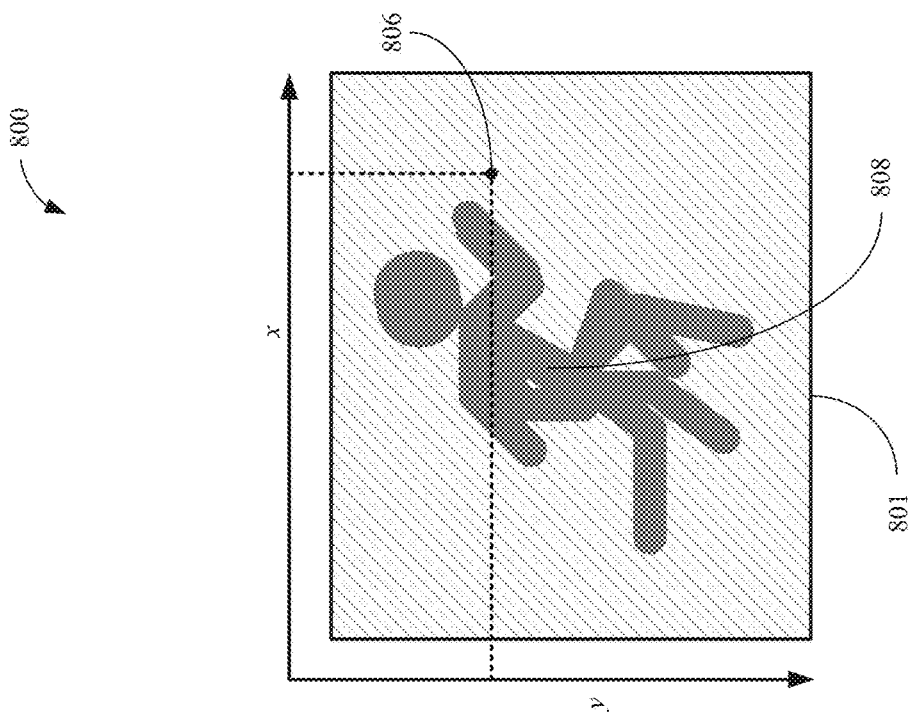
FIG. 8 is an illustration depicting an example operation for identifying portions of a second image frame having temporal differences relative to a first image frame, in accordance with some aspects of the present disclosure.
Figure 8:
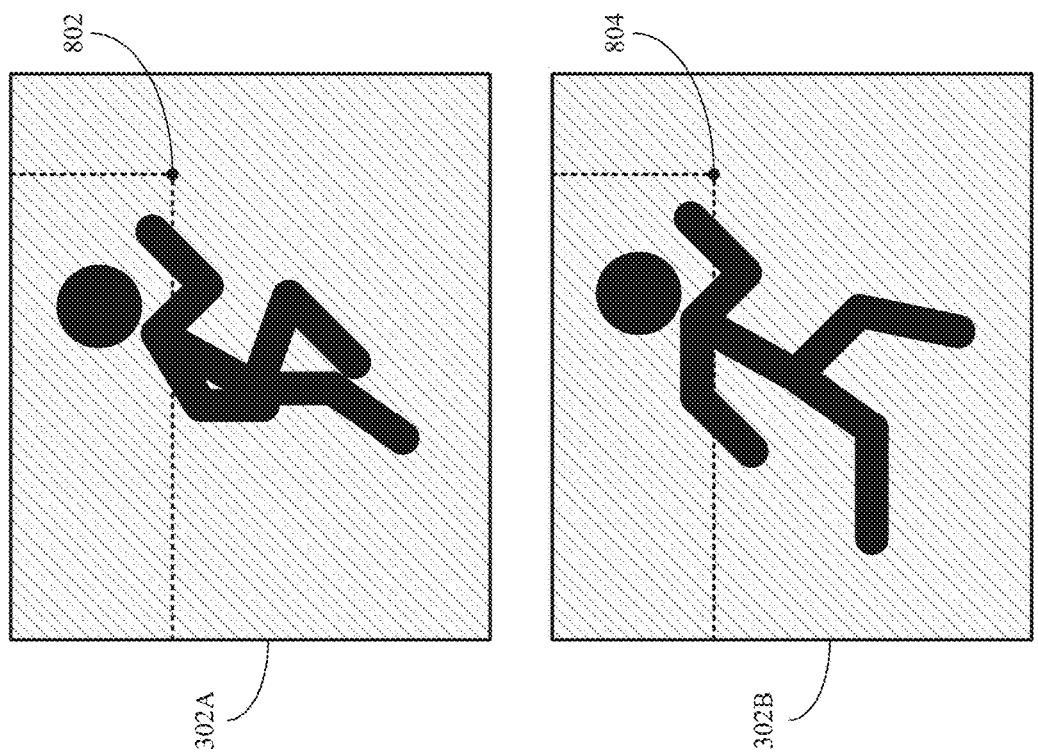

In some example implementations of a comparator (such as comparators 401, 501, or 601) determining or identifying one or more portions of a captured image frame with temporal differences relative to another captured image frame, the comparator may compare two or more captured image frames pixel-by-pixel. FIG. 8 is an illustration 800 depicting an example operation for determining portions of a second image with temporal differences relative to a first image, in accordance with some aspects of the present disclosure. More specifically, the illustration 800 depicts comparing the example first image 302A and the second image 302B (FIG. 3) on a pixel-by-pixel basis. In comparing the two images 302A and 302B (where the differences are shown in image 308), a comparator (such as one of comparators 401, 501, and 601) may compare a pixel at a location or position in image 302A (such as pixel 802) with a pixel at a corresponding location or position in image 302B (such as pixel 804). As shown by pixel 806 in 801, the location of pixel 802 and the location of pixel 804 are at the same location or position in their respective images. For example, the location may be a first number of pixels in the horizontal direction (x direction) in both images and a second number of pixels in the vertical direction (y direction) in both images. In 308, portion 802 may be determined to be the portion of second image 302B with temporal differences.

Figure 9:
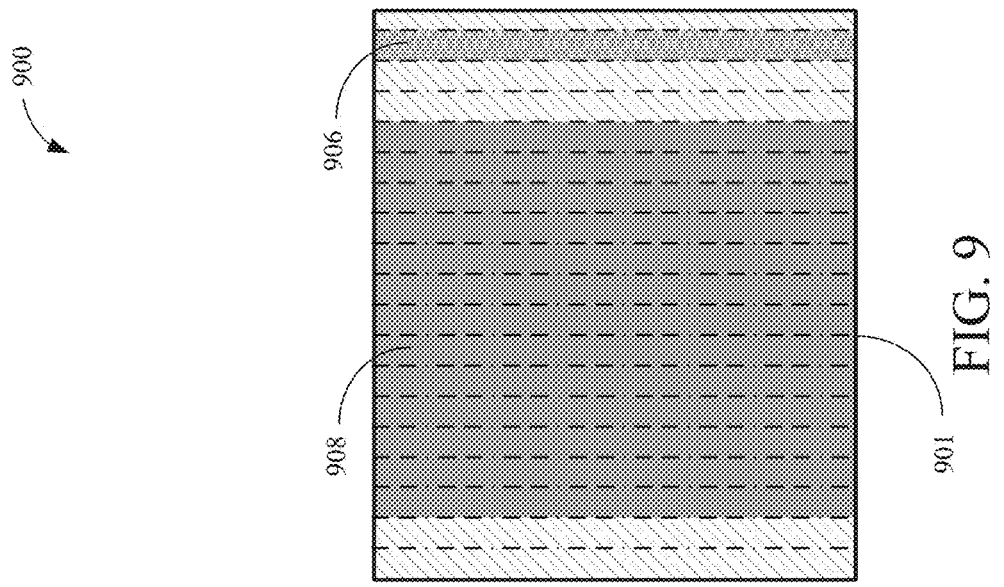
FIG. 9 is an illustration depicting another example operation for identifying portions of a second image having temporal differences relative to a first image, in accordance with some aspects of the present disclosure.
Figure 9:
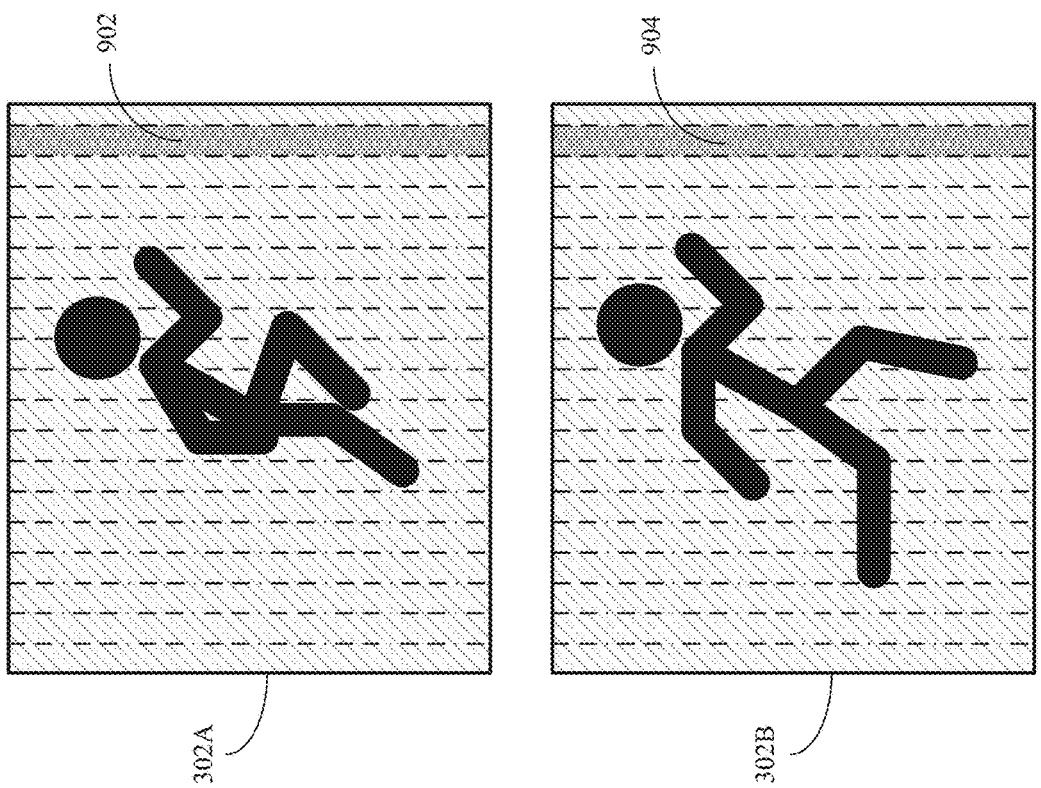

In some other example implementations of a comparator determining or identifying one or more portions of a captured image frame with temporal differences relative to another captured image frame, the comparator may compare two or more captured image frames along stripes, blocks, or other areas. FIG. 9 is an illustration 900 depicting another example operation for determining portions of a second image with temporal differences relative to a first image, in accordance with some aspects of the present disclosure. More specifically, the illustration 900 depicts comparing the first image 302A and the second image 302B by comparing corresponding stripes between the respective images. For example, in comparing images 302A and 302B, a comparator (such as one of comparators 401, 501, and 601) may compare stripes 902 and 904, which are in the same location in corresponding images 302A and 302B (as shown by stripe 906 in 901). In comparing stripes, the comparator may determine that portion 908 includes temporal differences since the corresponding stripe from image 302B includes temporal differences. Referring back to FIGS. 6 and 7, if comparator 601 compares stripes of captured image frames, then the pointer or indicator for the processed image frames 710B and 710C may include indications as to which processed stripes of the processed image frame 710A to use for the processed second image frame and the processed third image frame. While two examples for comparing captured image frames has been shown, any number of ways to compare captured image frames may exist, and the disclosure should not be limited to the illustrated examples.

The camera capturing the frames (such as camera 102 of device 100) may be moved between capturing frames. For example, a person using a smartphone or digital camera to take pictures may have minor movement, tilting, rotation, and so on, even if the person attempts to be still. As a result, a successive image may be rotated, zoomed in or out, shifted, or skewed as compared to a previous image. Such movements may cause a global motion in an image, wherein all portions of the image are moved or skewed from the corresponding locations in a previous image.

Figure 10:
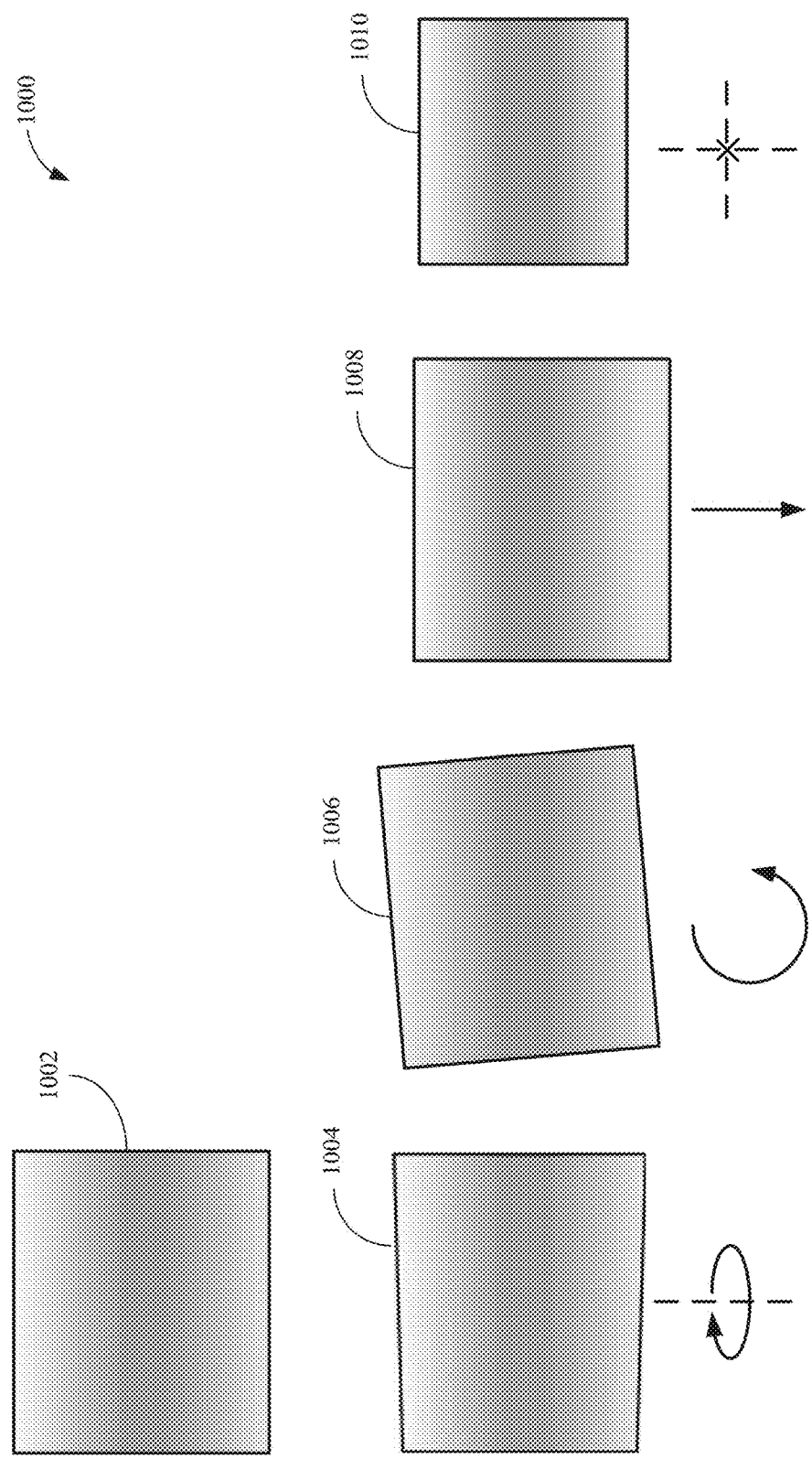
FIG. 10 is an illustration depicting examples of global motion between images.

FIG. 10 is an illustration 1000 depicting examples of global motion between images. Example image 1002 is a reference image where the scene captured in the image and a person's vantage of the scene remain static. Therefore, the example images 1004-1010 infer a movement of the camera capturing the images in relation to the scene and the person. One example of global motion is a change of perspective by the camera, where the camera rotates along an axis parallel to the scene. Image 1004 compared to reference image 1002 shows a change in perspective, where the image 1004 is similar to reference image 1002 but rotated along a vertical axis parallel to the scene. Thus, image 1004 is skewed compared to reference image 1002. Another example global motion is caused by a rotation of the camera along a plane parallel to the scene. Image 1006 shows an example, wherein image 1006 is similar to reference image 1002 but is slightly rotated along a plane parallel to the scene. Another example global motion is caused by a shifting or changing the position of the camera parallel to the scene. For example, the camera may shift up, down, left, right, or a combination of up or down and left or right. Image 1008 shows an example of shifting parallel to the scene, wherein image 1008 is similar to reference image 1002 but is shifted down as compared to the scene.

Another example global motion is caused by a shifting or changing the position of the camera toward or away from the scene. Thus, the scene may appear zoomed in or zoomed out when compared to a previous image. Image 1010 shows an example of shifting toward the scene (away from the person), wherein image 1010 is similar to reference image 1002 but would show a slightly zoomed in version of the previous image. While some examples of global motion are shown in FIG. 10, global motion may also include a combination of two or more of the described examples of global motion.

In some aspects of the present disclosure, a device (such as device 100) may compensate for a global motion before comparing captured image frames. Therefore, if a captured second image frame includes global motion compared to a captured first image frame, a device may attempt to adjust the captured second image frame to compensate for the global motion before comparing the captured first image frame and the captured second image frame. In some example implementations, a comparator (such as comparator 401 in FIG. 4) may adjust the captured second image frame to compensate for a global motion before determining portions with temporal differences. In some other example embodiments, a separate module may adjust the captured image frame before providing the adjust image frame to the comparator to determine the portions with temporal differences.

Figure 11:
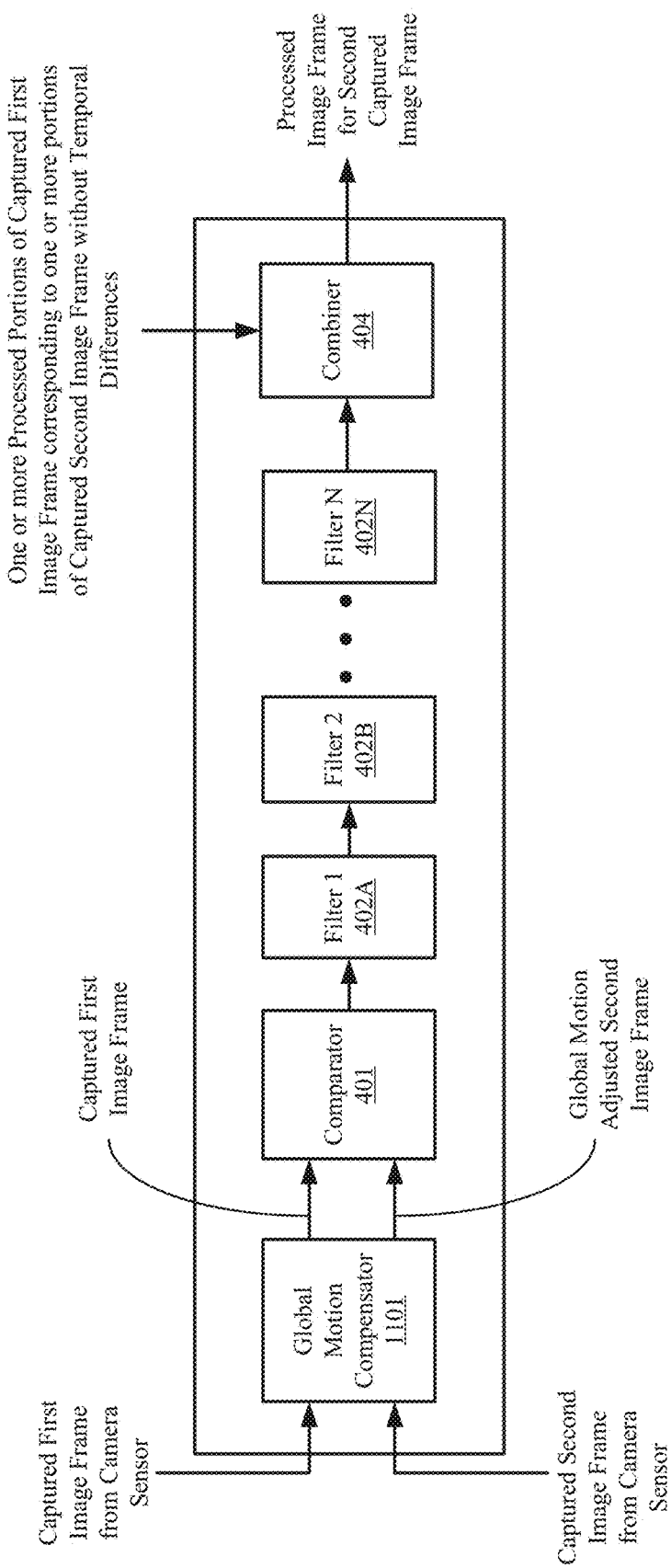
FIG. 11 is a block diagram of another example image signal processor, in accordance with some aspects of the present disclosure.

FIG. 11 is a block diagram of another example image signal processor 1100, in accordance with some aspects of the present disclosure. The image signal processor 1100, which may be another implementation of one or more of the image signal processors 130 of FIG. 1, is shown to include the comparator 401, the filters 402A-402N, and the combiner 404 of the image signal processor 400 of FIG. 4. The example image signal processor 1100 further includes a global motion compensator 1101 having inputs to receive captured image frames (provided by cameras 102 of FIG. 1) and having outputs coupled to respective inputs of the comparator 401. In some aspects, the global motion compensator 1101 may be configured to adjust a captured second image frame with global motion as compared to a captured first image frame, and then provide the captured first image frame and the adjusted second image frame to the comparator 401. The global motion compensator 1101 may be provided for or within any of the camera controllers or image signal processors disclosed herein.

Various processes exist for a device to determine and adjust a captured image frame to compensate for global motion. For example, a device may use object detection techniques in the frames in order to determine differences in location, size, and/or skew of an object in two captured frames to be compared. In another example, pattern recognition techniques may be used to determine the location or skew of patterns between two captured image frames. Thus, the present disclosure should not be limited to any specific process for determining and adjusting an image frame for global motion.

In some implementations, the global motion compensator 1101 may be configured to operate in a number of modes, for example, where in a first mode the global motion compensator 1101 adjusts an image frame, and in a second mode, the global motion compensator 1101 does not adjust the image frame. In some aspects, if the global motion compensator 1101 determines that the global motion is above a threshold or within a range, then the global motion compensator 1101 may operate in the first mode and adjust the image frame to compensate for global motion. Conversely, if the global motion compensator 1101 is not able to determine the global motion (such as if the global motion is too great), then the global motion compensator 1101 may operate in the second mode and not adjust the image frame. In other aspects, a user may configure the global motion compensator 1101 to operate in either the first mode or the second mode.

Figure 12:
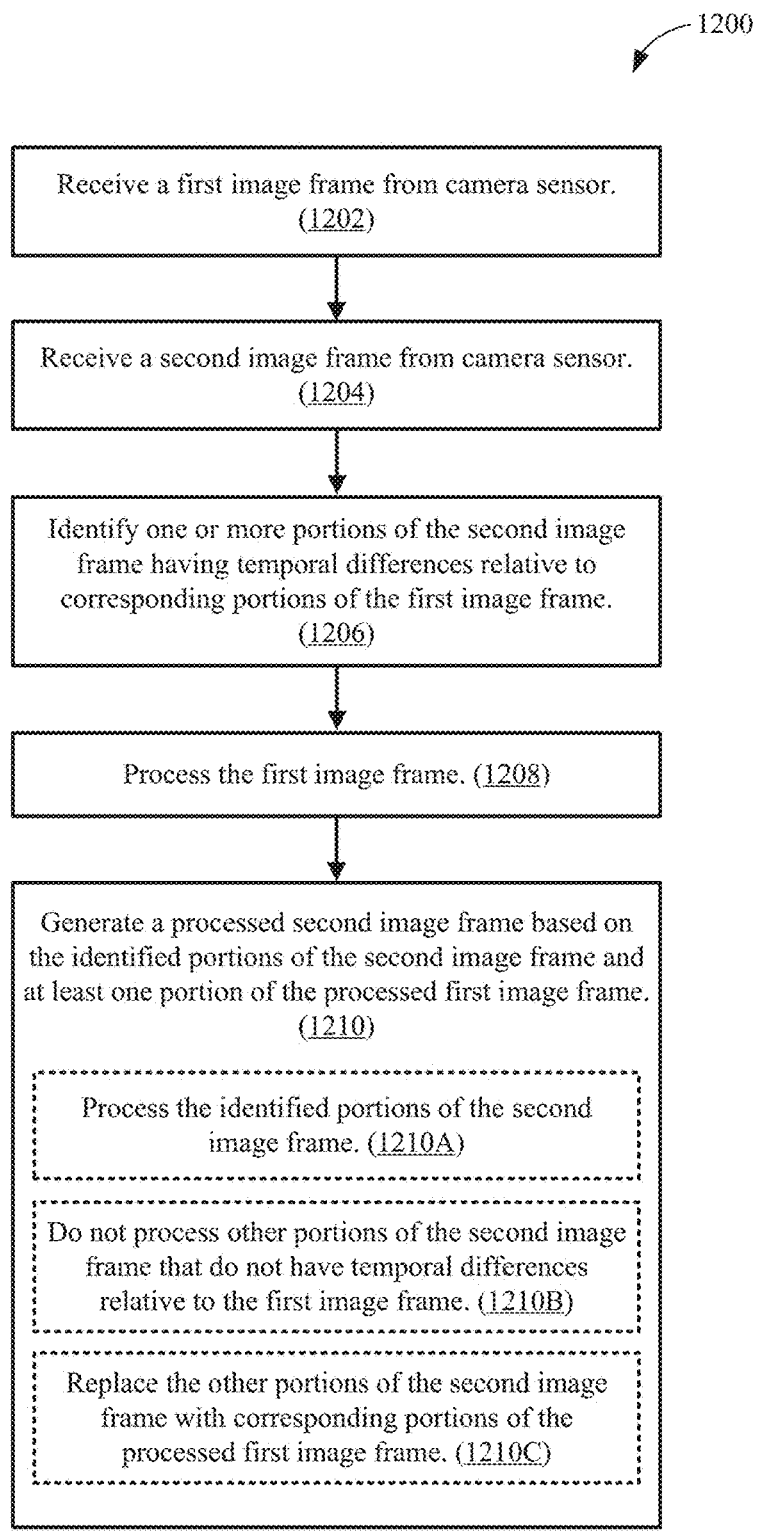
FIG. 12 is an illustrative flow chart depicting an example operation for processing a plurality of captured image frames, in accordance with some aspects of the present disclosure.

FIG. 12 is an illustrative flow chart depicting an example operation 1200 for processing a plurality of captured image frames, in accordance with some aspects of the present disclosure. Although the example operation 1200 is described below with respect to the device 100 of FIG. 1, it is to be understood that the example operation 1200 may be performed by other suitable devices that include various aspects of the present disclosure.

The device 100 may receive a first image frame from a camera sensor (1202), and may receive a second image frame from the camera sensor (1204). For example, if the camera is capturing video, the device 100 may receive from the camera sensor a plurality of image frames in quick succession. The device 100 may determine or identify one or more portions of the second image frame having temporal differences relative to corresponding portions of the first image frame (1206). For example, as previously described, the device 100 may compare the image frames at a pixel level, a macroblock, level, a stripe level, or other suitable level to determine or identify portions of the second image frame having temporal differences relative to the first image frame. In some example implementations, the device 100 may also determine or identify one or more portions of the second image frame without temporal differences, for example, such as the one or more portions not determined to have temporal differences.

The device 100 may process the first image frame (1208). In some implementations, the device 100 may process the entire first image frame by providing the entire first image frame through all of the filters (such as Filter 1 through Filter N) of a corresponding image signal processor. For one example, the entire first image frame may be processed by applying filters 402A-402N of the image signal processor 400 to all portions of the first image frame. For another example, the entire first image frame may be processed by applying filters 502A-502N of the image signal processor 500 to all portions of the first image frame. For yet another example, the entire first image frame may be processed by applying filters 602A-602N of the image signal processor 600 to all portions of the first image frame.

The device 100 may generate a processed second image frame based on the identified portions of the second image frame and at least one portion of the processed first image frame (1210). More specifically, the device 100 may process portions of the second image frame identified to have temporal differences from or relative to corresponding portions of the first image frame (1208A), may not process other portions of the second image frame that do not have temporal differences relative to the first image frame (1208B), and may replace the other portions of the second image frame with corresponding portions of the processed first image frame (1208C). In other words, the device 100 only processes portions of the second image frame identified to have temporal differences relative to the first image frame, which in turn may reduce the processing resources, memory requirements, latency constraints, and thermal dissipation of image capturing devices. In some aspects, the device 100 may process the identified portions of the second image frame and process the first image frame at the same time (or at substantially the same time), for example, as described above with respect to FIGS. 5 and 6.

Figure 13:
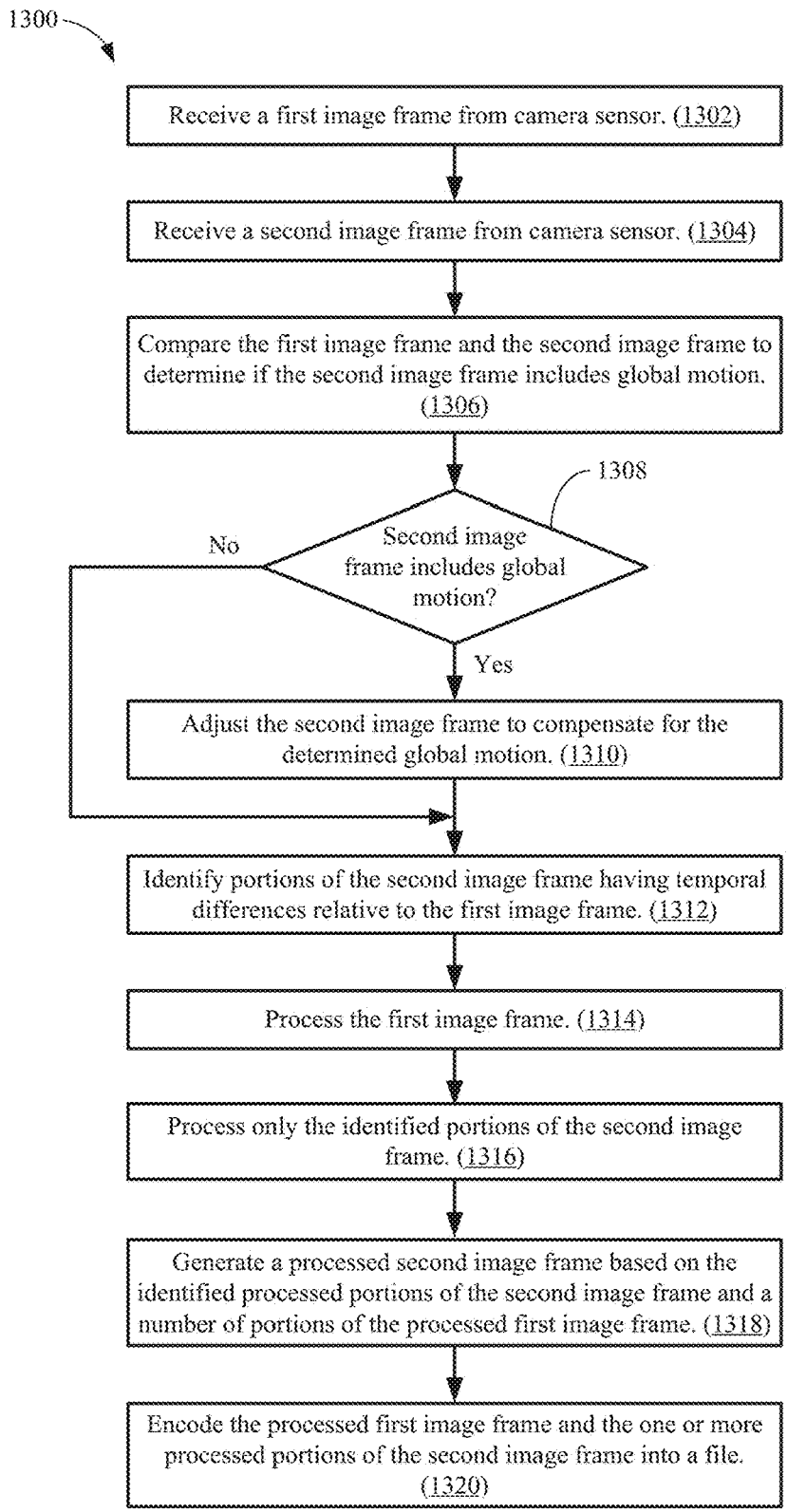
FIG. 13 is an illustrative flow chart depicting another example operation for processing a plurality of captured image frames, in accordance with some aspects of the present disclosure.

FIG. 13 is an illustrative flow chart depicting another example operation 1300 for processing a plurality of captured image frames, in accordance with some aspects of the present disclosure. Although the example operation 1300 is described below with respect to the device 100 of FIG. 1, it is to be understood that the example operation 1300 may be performed by other suitable devices that include various aspects of the present disclosure.

The device 100 may receive a first image frame from a camera sensor (1302), and may receive a second image frame from the camera sensor (1304). Then, the device 100 may compare the first image frame and the second image frame to determine if the second image frame includes global motion (1306). If the second image frame does not include global motion, as tested at 1308, then the operation 1300 proceeds to 1310. Conversely, if the second image frame includes global motion, as tested at 1308, then the device 100, using the global motion compensator 1101 of FIG. 11, may adjust the second image frame to compensate for the global motion (1310).

The device 100 may determine or identify one or more portions of the second image frame having temporal differences relative to corresponding portions of the first image frame (1312). For example, as previously described, the device 100 may compare the image frames at a pixel level, a macroblock, level, a stripe level, or other suitable level to determine or identify portions of the second image frame having temporal differences relative to the first image frame. The device 100 may also determine or identify one or more portions of the second image frame without temporal differences, for example, such as the one or more portions not determined to include temporal differences.

The device 100 may process the first image frame (1314). In some implementations, the device 100 may process the entire first image frame by providing the entire first image frame through all of the filters (such as Filter 1 through Filter N) of a corresponding image signal processor. For one example, the entire first image frame may be processed by applying filters 402A-402N of the image signal processor 400 to all portions of the first image frame. For another example, the entire first image frame may be processed by applying filters 502A-502N of the image signal processor 500 to all portions of the first image frame. For yet another example, the entire first image frame may be processed by applying filters 602A-602N of the image signal processor 600 to all portions of the first image frame.

The device 100 may process only the identified portions of the second image frame (1316). For example, as described above, the device 100 may process the one or more portions of the second image frame identified to have temporal differences relative to corresponding portions of the first image frame, may not process portions of the second image frame that do not have temporal differences relative to the first image frame, and may replace portions of the second image frame that do not have temporal differences relative to the first image frame with corresponding portions of the processed first image frame.

The device 100 may then generate a processed second image frame based on the identified processed portions of the second image frame and a number of processed portions of the first image frame (1318). The number of processed portions of the first image frame may correspond to portions of the second image frame that were not processed. In some implementations, the device 100 may combine one or more processed portions of the first image frame with the processed one or more portions of the second image frame to generate the processed second image frame. Additionally, or alternatively, the device may optionally encode the processed first image frame and the one or more processed portions of the second image frame into a file, such as a video file (1318). As previously described, the file may include for the second image frame a pointer or other indicator to portions of the first image frame to be combined with the processed portions of the second image frame to create the complete processed second image frame.

Figure 14:
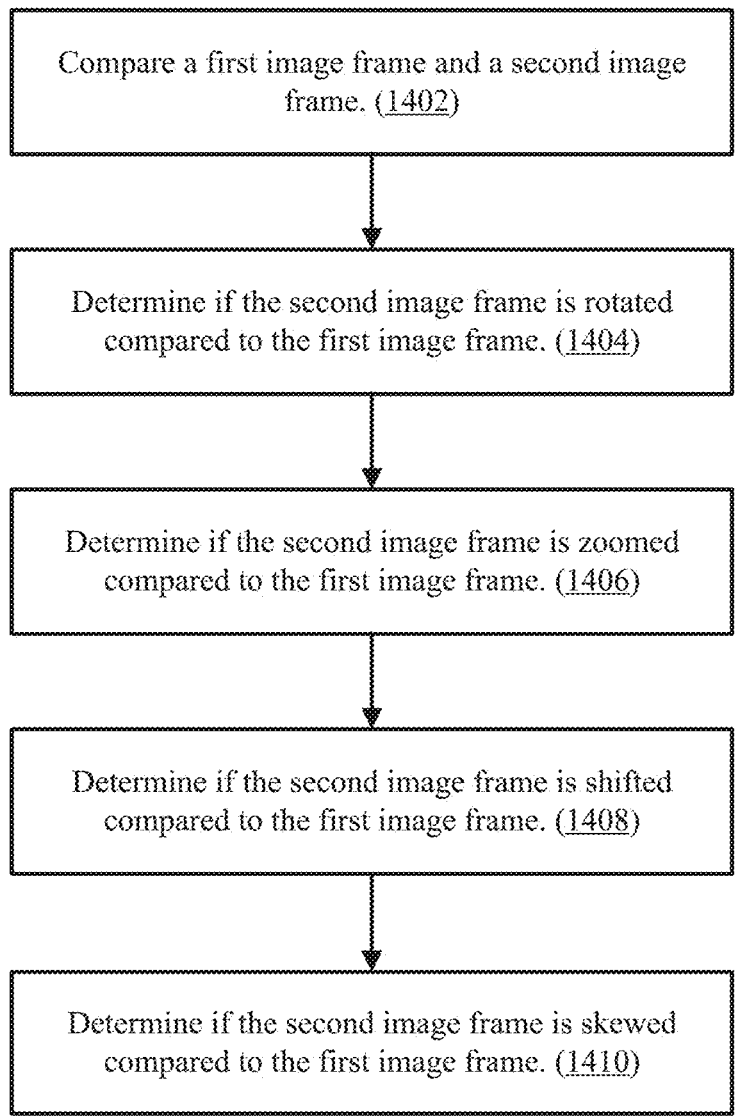
FIG. 14 is an illustrative flow chart depicting an example operation for determining if an image frame includes global motion, in accordance with some aspects of the present disclosure.

FIG. 14 is an illustrative flow chart depicting an example operation 1400 for determining if an image frame includes global motion, in accordance with some aspects of the present disclosure. Although the example operation 1400 is described below with respect to the device 100 of FIG. 1, it is to be understood that the example operation 1400 may be performed by other suitable devices that include various aspects of the present disclosure. The device 100 compares a first image frame and a second image frame (1402). From the comparison, the device 100 determines if the second image frame is rotated compared to the first image frame (1404). The device 100 also determines if the second image frame is zoomed compared to the first image frame (1406). The device also determines if the second image frame is shifted compared to the first image frame (1408). The device 100 also determines if the second image frame is skewed compared to the first image frame (1410).

In some aspects of the present disclosure, the device 100 may determine local motion. For example, a car, boat, or other object may be in one location in a first image frame, but move to a different location in a second image frame. Therefore, the second image frame includes local motion corresponding to the moving object (such as a car or boat). If local motion is identified for a portion of the second image frame, with the corresponding portions of the two image frames identified, the device 100 may use the portion of the processed first image frame for the portion of the second image frame at a different location. In comparing image frames and determining local motion, the device 100 may compare the image frames at a macroblock level, or the device 100 may determine the edges or border of an object in order to use a unique shape in determining a portion of an image frame for comparison. For example, in determining a portion of an image frame to be a person, the device 100 may determine an outline of the person in order to determine the portion of the image frames corresponding to the person.

Figure 15:
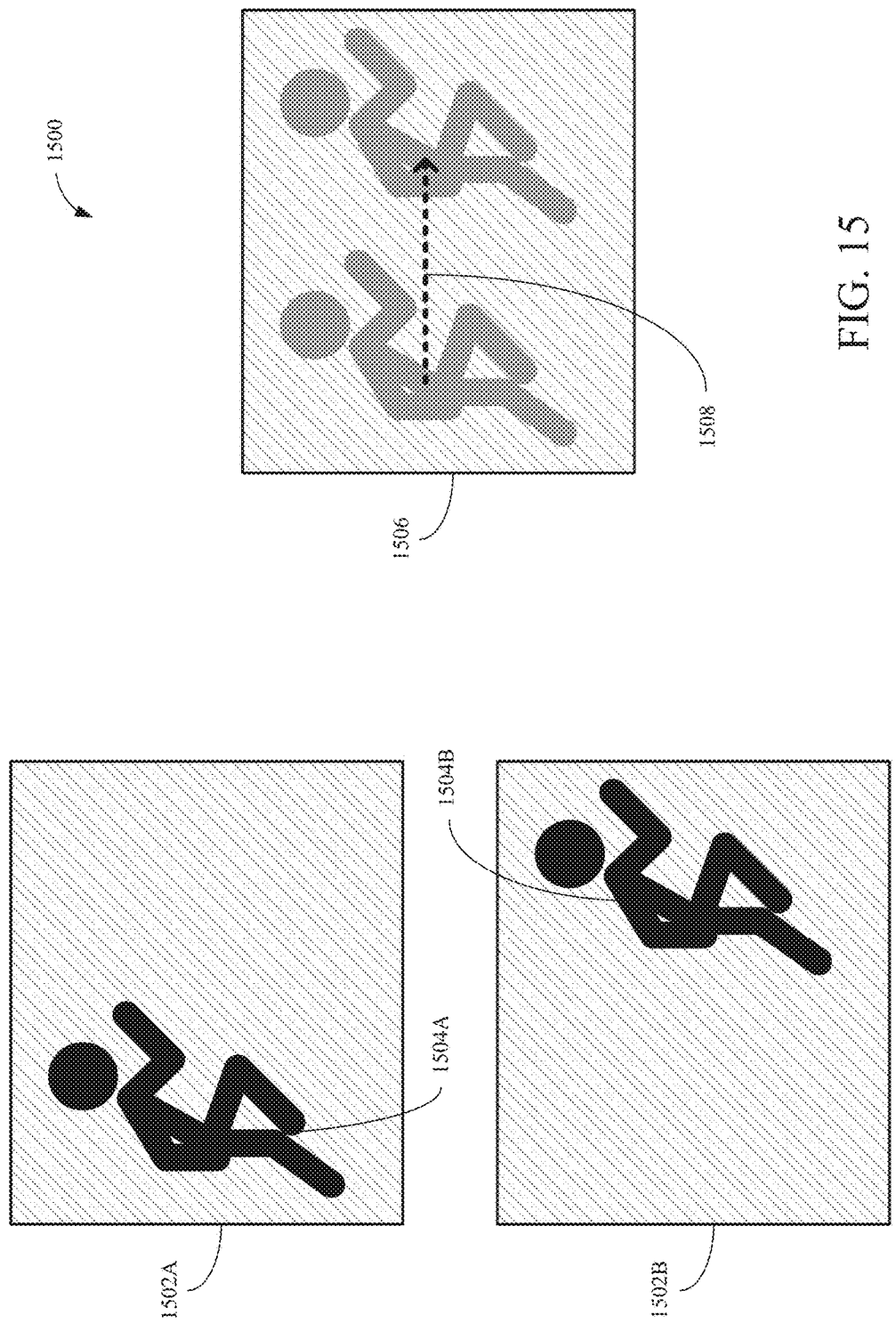
FIG. 15 is an illustration depicting an example of local motion between two images.

FIG. 15 is an illustration 1500 depicting an example of local motion between a first image 1502A and a second image 1502B. The person 1504A in the first image 1502A is the same as person 1504B in the second image frame 1502B, but in a different location in the image frame. Composite image 1506 illustrates the difference in location, as indicated by vector 1508. Thus, if the device 100 identifies second image 1502B as having local motion for person 1504B (corresponding to the location in the first image frame 1502A of person 1504A), the device 100 may use the processed portion of image frame 1502A corresponding to the person 1504A for the portion of image frame 1502B corresponding to person 1504B. For example, the comparator 501 (FIG. 5) may identify the local motion of the second image frame and determine that the corresponding portion of the second image frame is not to be processed. In addition, the combiner 506 may combine the processed portion of the first image frame, corresponding to the local motion in the second image frame, at the appropriate location in the second image frame with the processed portions of the second image frame from Filter N 504N.

In the illustrated example of local motion, the person is shown to have only changed location in the image frames. The person is not shown to have turned, changed his head position, or otherwise change orientations of parts of his body. In some example implementations, though, the device 100 may also account for changes in orientation of an object or parts of an object when identifying local motion.

FIG. 16 is an illustration 1600 depicting another example of local motion between a first image 1602A and a second image 1602B. In addition to person 1604A in the first image frame 1602A being in a different location in the second image frame 1602B (person 1604B), the orientation of the person changes between image frames 1602A and 1602B. In some example implementations, the device 100 may compare parts of the object between the two image frames. For example, referring to composite image 1606, the device 100 may compare the head of person 1604A with the head of person 1604B to determine local motion (indicated by vector 1608A). In another example, the device 100 may compare the torso of person 1604A with the torso of person 1604B to determine local motion (indicated by vector 1608B). In a further example, the device 100 may compare a leg of person 1604A with a leg of person 1604B to determine local motion (indicated by vector 1608C).

As illustrated, the orientation of the object or parts of the object may change between image frames (such as the compared legs of person 1604A and 1604B in the above example). A change in orientation may cause the object (or parts of the object) to appear rotated, skewed, and/or zoomed in addition to the change in location in the image frames. Thus, the device 100 may adjust the portion of the first image frame and/or the portion of the second image frame being compared to compensate for changes in orientation. For example, the device 100 may rotate, zoom and/or skew one or more of the portions being compared.

Some differences in orientation may be great enough that the processed portion from one image frame cannot be used for processing the second image frame. For example, person 1604A may turn his head to the side toward the camera for 1604B. Hence, the processed portion of the head for the first image 1602A may be unusable in processing the second image 1602B because the first image 1602A does not include the face. Thus, if the device 100 determines local motion exists, but determines that corresponding portions of the image frames is too different, the device 100 may determine to process the portion of the second image frame, even though the portion corresponds to a portion of the first image frame. For example, the device 100 may use a blending filter, averaging, contour mapping, pattern recognition, or other functions to create a characteristic to compare between portions of image frames. If the difference between characteristics is above a determined threshold, then the device 100 may determine to still process the portion of a second image frame. While some examples of determining when to use processed portions of an object subject to local motion in the image frames are provided, the disclosure should not be limited to the provided examples.

Figure 17:
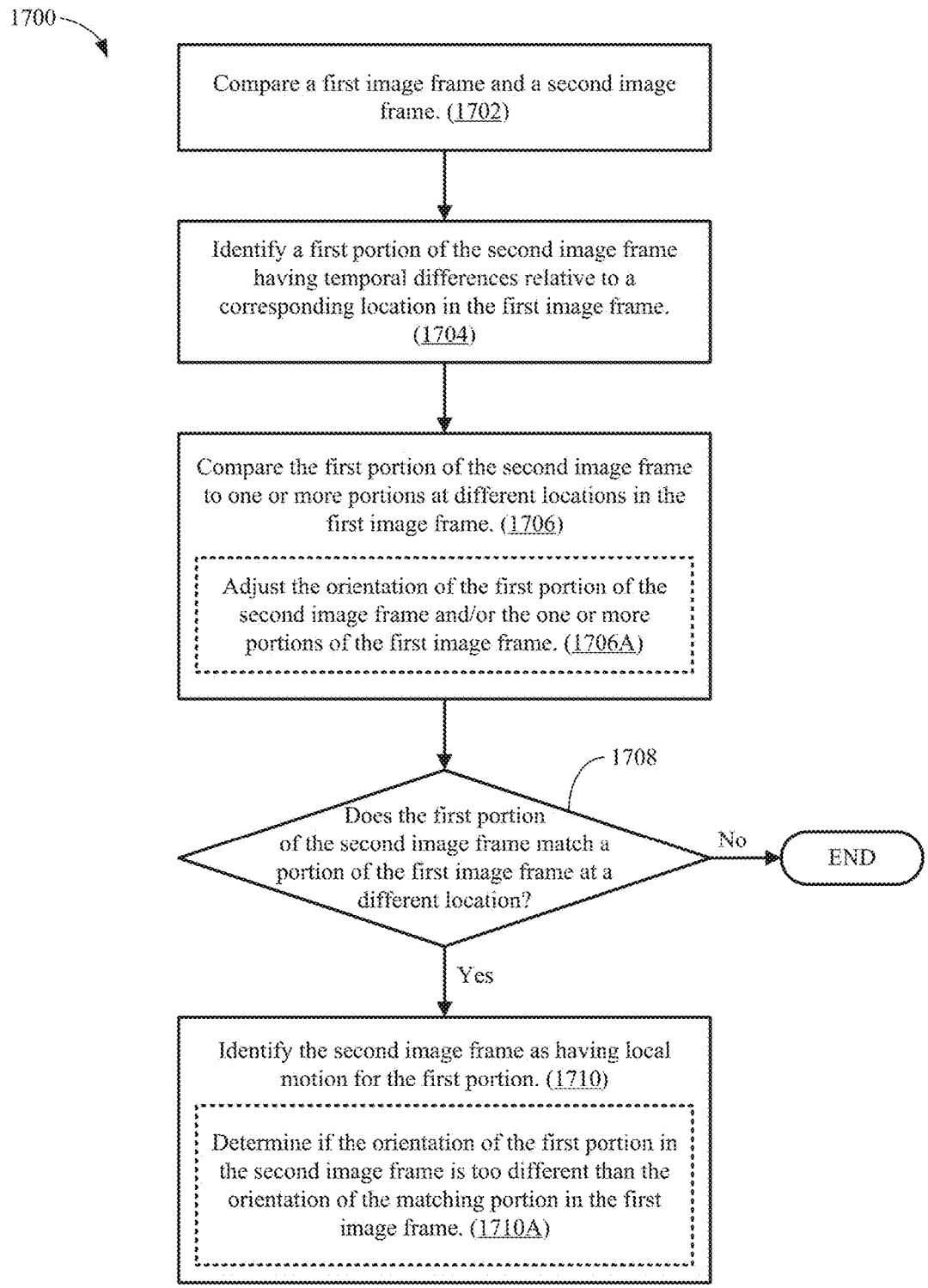
FIG. 17 is an illustrative flow chart depicting an example operation for determining if an image frame includes local motion, in accordance with some aspects of the present disclosure.

FIG. 17 is an illustrative flow chart depicting an example operation 1700 for determining if an image frame includes local motion, in accordance with some aspects of the present disclosure. Although the example operation 1700 is described below with respect to the device 100 of FIG. 1, it is to be understood that the example operation 1700 may be performed by other suitable devices that include various aspects of the present disclosure. The device 100 compares a first image frame and a second image frame (1702). From the comparison, the device 100 identifies a first portion of the second image frame having temporal differences relative to a corresponding location in the first image frame (1704). The device 100 may then attempt to determine if the second image frame includes local motion for the first portion. To do so, the device 100 may compare the first portion of the second image frame to one or more portions at different locations in the first image frame (1706). In comparing, the device 100 may optionally adjust the orientation of the first portion of the second image frame and/or the one or more portions of the first image frame being compared (1706A). For example, the device 100 may skew, may rotate, may zoom, or may perform a combination of the above on the first portion of the second image frame when comparing to one or more portions of the first image frame.

If the device 100 does not identify a match between a portion of the first image frame and the first portion of the second image frame (1708), then the process ends without the device 100 identifying local motion for the first portion. Thus, the first portion of the second image frame may be processed when processing the second image frame. If the device 100 identifies a match between a portion of the first image frame and the first portion of the second image frame (1708), then the device 100 identifies that second image frame as having local motion of the first portion (1710). Thus, the device 100 might not process the first portion of the second image frame, instead using the processed portion of the first image frame matching the first portion of the second image frame.

In identifying the second image frame as having local motion, the device 100 may optionally determine if the orientation of the first portion in the second image frame is too different than the orientation of the matching portion in the first image frame. The orientation difference is too great if the processed portion from the first image frame cannot be used processing the second image frame. In some example implementations, the device 100 compares the differences between the two portions (such as the difference in features, patterns, edges, contours, luminance, and so on), wherein thresholds may be used to determine if the differences are too great.

While operation 1700 describes determining is local motion exists for one portion of an image frame, the device 100 may determine local motion for multiple portions of an image frame. Hence, the present disclosure should not be limited to the above examples.

In some aspects of the present disclosure, a camera controller (such as camera controller 110) processing captured image frames may be configured to operate in different modes. In some example implementations, the camera controller may operate in a first mode, where captured image frames are processed in their entirety, and the camera controller may operate in a second mode, where only portions of a captured image frame is processed, as described above. Various conditions may be used by a device to change between modes. In some example implementations, a user may be able to set whether the device is to operate in the first mode or the second mode. In some other example implementations, the device may determine that the portions of a captured second image frame with temporal differences is above a threshold (such as more than fifty percent of the image frame). In some further example implementations, the device may not be able to compensate for a global motion such that a captured second image frame is to be processed in its entirety. In yet some additional example implementations, the device may operate in a first mode where all frames are processed in their entirety while computing resources of the device and/or the temperature of the image signal processor are within a predetermined range. If computing resources (such as available memory, processor resources, and so on) go below the range, or the temperature goes above a predefined range, then the device may operate in a second mode where only portions of a captured second image frame are processed.

The techniques described herein may be implemented in hardware, software, firmware, or any combination thereof, unless specifically described as being implemented in a specific manner. For example, the described various filters (such as filters 402A-402N, 502A-502N, 504A-504N, 602A-602N, and 604A-604N), comparators (such as comparators 401, 501, and 601), global motion compensators (such as the global motion compensator 1101), combiners (such as the combiners 404 and 506), and temporal encoders (such as the temporal encoder 606) may be implemented as specialty or integrated circuits in an image signal processor, as software (such as instructions 108) to be executed by one or more of the image signal processors 130 of camera controller 110 or one or more processors 104 (which may be one or more image signal processors), or as firmware. Also, some components (such as a noise reduction filter) may be implemented in hardware while other components (such as the comparator) is implemented in software. Any features described may also be implemented together in an integrated logic device or separately as discrete but interoperable logic devices. If implemented in software, the techniques may be realized at least in part by a non-transitory processor-readable storage medium (such as memory 106 in FIG. 1) comprising instructions (such as instructions 108 or other instructions accessible by one or more image signal processors) that, when executed by one or more processors (such as processor(s) 104 or one or more image signal processors in a camera controller 110), performs one or more of the methods described above. Portions of the instructions may also be executed by different processors, such as a first portion being executed by one or more processors 104 and a second portion being executed by one or more image signal processors in a camera controller 110. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more of the processors 104 in FIG. 1 or one or more of the image signal processors 130 that may be provided within the camera controller 110. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. For example, while processing a first and second (and third) image frame is described, a device may process any number of image frames, according to some aspects of the present disclosure. Accordingly, the disclosure is not limited to the illustrated examples, and any means for performing the functionality described herein are included in aspects of the disclosure.

What is claimed is:

1. A method for processing a plurality of captured image frames, comprising:
    receiving a first image frame from a camera sensor;
    receiving a second image frame from the camera sensor;
    identifying a first portion of the second image frame having a temporal difference relative to a corresponding first portion of the first image frame, wherein a second portion of the second image frame is without a temporal difference relative to a corresponding second portion of the first image frame;
    processing the first image frame; and
    generating a processed second image frame based on the identified first portion of the second image frame and at least one portion of the processed first image frame, wherein generating the processed second image frame comprises processing the identified first portion of the second image frame without processing the second portion of the second image frame.

2. The method of claim 1, wherein generating the processed second image frame comprises:
    combining the processed identified first portion of the second image frame and the at least one portion of the processed first image frame.

3. The method of claim 1, wherein identifying a first portion of the second image frame having a temporal difference relative to a corresponding first portion of the first image frame comprises:
    identifying the second image frame having local motion for the first portion of the second image frame, wherein a location of the first portion of the second image frame is different than a location of the first portion of the first image frame.

4. The method of claim 1, further comprising storing the processed first image frame and the processed first portion of the second image frame in a video file.

5. The method of claim 1, wherein the identified first portion of the second image frame and the first image frame are processed concurrently.

6. The method of claim 5, further comprising:
    receiving a number of additional image frames from the camera sensor; and
    processing a portion of each additional image frame, wherein the first image frame and the portion of each additional image frame are processed concurrently.

7. The method of claim 1, further comprising:
    prior to identifying the first portion of the second image frame, adjusting the second image frame to compensate for a global motion between the first image frame and the second image frame.

8. A device for processing a plurality of captured image frames, comprising:

a camera sensor to provide a first image frame and a second image frame; and one or more processors configured to:
identify a first portion of the second image frame having a temporal difference relative to a corresponding first portion of the first image frame, wherein a second portion of the second image frame is without a temporal difference relative to a corresponding second portion of the first image frame;
process the first image frame; and
generate a processed second image frame based on the identified first portion of the second image frame and at least one portion of the processed first image frame, wherein generating the processed second image frame comprises processing the identified first portion of the second image frame without processing the second portion of the second image frame.

9. The device of claim 8, wherein the one or more processors are configured to generate the processed second image frame by further:
combining the processed identified first portion of the second image frame and the at least one portion of the processed first image frame.

10. The device of claim 8, wherein the one or more processors in identifying a first portion of the second image frame having a temporal difference relative to a corresponding first portion of the first image frame are configured to:
identify the second image frame as having local motion for the first portion of the second image frame, wherein a location of the first portion of the second image frame is different than a location of the first portion of the first image frame.

11. The device of claim 8, wherein the one or more processors are configured to:
store the processed first image frame and the processed first portion of the second image frame in a video file.

12. The device of claim 8, wherein the identified first portion of the second image frame and the first image frame are processed concurrently.

13. The device of claim 12, wherein the one or more processors are configured to:
for each of a number of additional image frames, identify a portion of the additional image frame having a temporal difference relative to a corresponding portion of the first image frame; and
process the identified portion of each additional image frame, wherein the first image frame and the identified portion of each additional image frame are processed concurrently.

14. The device of claim 8, wherein the one or more processors are configured to:
prior to identifying the first portion of the second image frame, adjust the second image frame to compensate for a global motion between the first image frame and the second image frame.

15. The device of claim 8, wherein the one or more processors are one or more image signal processors.

16. A non-transitory computer-readable storage medium storing one or more programs containing instructions that, when executed by one or more processors of a device, cause the device to perform operations comprising:
receiving a first image frame from a camera sensor;
receiving a second image frame from the camera sensor;
identifying a first portion of the second image frame having a temporal difference relative to a corresponding first portion of the first image frame, wherein a second portion of the second image frame is without a temporal difference relative to a corresponding second portion of the first image frame;
processing the first image frame; and
generating a processed second image frame based on the identified first portion of the second image frame and at least one portion of the processed first image frame, wherein generating the processed second image frame comprises processing the identified first portion of the second image frame without processing the second portion of the second image frame.

17. The non-transitory computer-readable storage medium of claim 16, wherein execution of the instructions to generate the processed second image causes the device to perform operations further comprising:
combining the processed identified first portion of the second image frame and the at least one portion of the processed first image frame.

18. The non-transitory computer-readable storage medium of claim 16, wherein execution of the instructions, to cause the device to identify a first portion of the second image frame having a temporal difference relative to a corresponding first portion of the first image frame, causes the device to perform operations comprising:
identifying the second image frame having local motion for the first portion of the second image frame, wherein a location of the first portion of the second image frame is different than a location of the first portion of the first image frame.

19. The non-transitory computer-readable storage medium of claim 16, wherein execution of the instructions causes the device to perform operations further comprising:
storing the processed first image frame and the processed first portion of the second image frame in a video file.

20. The non-transitory computer-readable storage medium of claim 16, wherein the identified first portion of the second image frame and the first image frame are processed concurrently.

21. The non-transitory computer-readable storage medium of claim 20, wherein execution of the instructions causes the device to perform operations further comprising:
receiving a number of additional image frames from the camera sensor; and
processing a portion of each additional image frame, wherein the first image frame and the portion of each additional image frame are processed concurrently.

22. The non-transitory computer-readable storage medium of claim 16, wherein execution of the instructions causes the device to perform operations further comprising:
prior to identifying the first portion of the second image frame, adjusting the second image frame to compensate for a global motion between the first image frame and the second image frame.

23. A device for processing a plurality of captured image frames, comprising:
means for receiving a first image frame from a camera sensor;
means for receiving a second image frame from the camera sensor;
means for identifying a first portion of the second image frame having a temporal difference relative to a corresponding first portion of the first image frame, wherein a second portion of the second image frame is without a temporal difference relative to a corresponding second portion of the first image frame;
means for processing the first image frame; and
means for generating a processed second image frame based on the identified first portion of the second image frame and at least one portion of the processed first image frame, wherein the means for generating the processed second image frame is to process the identified first portion of the second image frame without processing the second portion of the second image frame.

24. The device of claim 23, wherein the means for generating the processed second image frame is to further:
combine the processed identified first portion of the second image frame and the at least one portion of the processed first image frame.

25. The device of claim 23, wherein the means for identifying a first portion of the second image frame having a temporal difference relative to a corresponding first portion of the first image frame comprises:
identifying the second image frame having local motion for the first portion of the second image frame, wherein a location of the first portion of the second image frame is different than a location of the first portion of the first image frame.

26. The device of claim 23, wherein the identified first portion of the second image frame and the first image frame are processed concurrently.

* * * * *